(12) United States Patent
Keller et al.

(10) Patent No.: US 7,273,509 B1
(45) Date of Patent: *Sep. 25, 2007

(54) SYNTHESIS OF METAL NANOPARTICLE COMPOSITIONS FROM METALLIC AND ETHYNYL COMPOUNDS

(75) Inventors: Teddy M. Keller, Fairfax Station, VA (US); Syed B. Qadri, Fairfax Station, VA (US)

(73) Assignee: The United States of America as of of America as represented by the Secretary of the Navy, Washington, DC (US)

( * ) Notice: Subject to any disclaimer, the term of this patent is extended or adjusted under 35 U.S.C. 154(b) by 614 days.

This patent is subject to a terminal disclaimer.

(21) Appl. No.: 10/875,806

(22) Filed: Jun. 24, 2004

Related U.S. Application Data

(63) Continuation-in-part of application No. 10/216,469, filed on Jul. 26, 2002, now Pat. No. 6,846,345, which is a continuation-in-part of application No. 10/006,226, filed on Dec. 10, 2001, now Pat. No. 6,673,953, and a continuation-in-part of application No. 10/006,385, filed on Dec. 10, 2001, now Pat. No. 6,884,861.

(51) Int. Cl.
*B22F 9/24* (2006.01)
(52) U.S. Cl. .......................... 75/362; 75/369
(58) Field of Classification Search .................. 75/362, 75/369
See application file for complete search history.

(56) References Cited

U.S. PATENT DOCUMENTS 6,884,861 B2 * 4/2005 Keller et al. ................ 526/285
6,890,504 B2 * 5/2005 Keller et al. ................ 423/440
7,198,771 B2 * 4/2007 Keller et al. ................ 423/440

OTHER PUBLICATIONS

Weyland, Tania et al., "[(Cp*)(dppe)Fe(III)-]+ Units Bridged through 1,3-Diethynylbenzene and 1,3,5-Triethynylbenzene Spacers: Ferromagnetic Metal—Metal Exchange Interaction", *Organometallics*, vol. 17, 1998, pp. 5569-5579.*

Hutton, Howard et al., "Preparation of Nanoscale Platinum(0) Clusters in Glassy Carbon andTheir Catalytic Activity", *Chem. Mater.*, vol. 5, 1993, pp. 1727-1738.*

* cited by examiner

*Primary Examiner*—George Wyszomierski
(74) *Attorney, Agent, or Firm*—John J. Karasek; Joseph T. Grunkemeyer

(57) ABSTRACT

A process of making metal nanoparticles comprising the steps of: providing a precursor composition comprising at least one metallic compound and at least one organic compound; wherein the organic compound is selected from the group consisting of an ethynyl compound, a metal-ethynyl complex, and combinations thereof; wherein the precursor composition is a liquid or a solid at room temperature; and heating the precursor composition under conditions effective to produce metal nanoparticles. A metal nanoparticle composition comprising metal nanoparticles dispersed homogenously in a matrix selected from the group consisting of ethynyl polymer, crosslinked ethynyl polymer, amorphous carbon, carbon nanotubes, carbon nanoparticles, graphite, and combinations thereof.

17 Claims, 7 Drawing Sheets

SYNTHESIS OF METAL NANOPARTICLE COMPOSITIONS FROM METALLIC AND ETHYNYL COMPOUNDS

This nonprovisional patent application is a continuation-in-part application of U.S. patent application Ser. No. 10/216,469 filed on Jul. 26, 2002 now U.S. Pat. No. 6,846,345, which is a continuation-in-part application of U.S. patent application Ser. No. 10/006,226 filed on Dec. 10, 2001, now U.S. Pat. No. 6,673,953 issued on Jan. 6, 2004, and a continuation-in-part application of U.S. patent application Ser. No. 10/006,385 also field on Dec. 10, 2001 now U.S. Pat. No. 6,884,861. U.S. patent application Ser. No. 10/216,470 filed on Jul. 26, 2002 is incorporated herein by reference.

BACKGROUND OF THE INVENTION

1. Field of the Invention

The invention relates generally to organic and carbon compositions comprising metal nanoparticles and methods of synthesizing metal nanoparticles. The invention also relates to new metal phase, for example, $Fe_3Pd$, Mn, fcc PdCo, $Fe_4Pt$, RuCo, CoMn, RuFe, and nanoparticles of bcc Co.

2. Description of the Prior Art

The term "nanoparticles" generally describes particles with diameters of about 1-100 nm. Metal nanoparticles can have electromagnetic properties different from the bulk metal. This can be caused by surface effects due to the high surface area to volume ratio.

Several methods of synthesizing metal nanoparticles are summarized in Leslie-Pelecky et al., "Magnetic Properties of Nanostructured Materials," *Chem. Mater.* 1996, 8, 1770-1783. These methods include reduction of metal salt by alkali metal in a hydrocarbon solvent, borohydride reduction of transition metal, metal vapor deposition, acoustic cavitation of liquid metal, fabrication via inversed micelles, evaporation/condensation of metal, sputtering, mechanical alloying, carbon arc, and partial recrystallization. None of these methods produce metal nanoparticles by heating a metallic compound and an organic compound.

Prinz, "Stabilization of bcc Co via Epitaxial Growth on GaAs," *Phys. Rev. Lett.* 54, 10, 1051-1054, discloses a method of making an epitaxial film of bcc Co. The bcc Co is not in the form of nanoparticles.

There is need for rigid carbon composition containing metal nanoparticles. There is a further need for a process for synthesis of metal nanoparticles in a bulk material. There is a further need for new metal phases that have not be made by conventional means.

SUMMARY OF THE INVENTION

It is an object of the invention to provide a process for synthesizing metal nanoparticles in bulk.

It is a further object of the invention to provide rigid metal nanoparticle compositions.

It is a further object of the invention to provide metal nanoparticle materials that may be useful for structural, data storage, microelectronic, motor, generator, battery energy storage, sensor, medical, and catalytic applications.

It is a further object of the invention to provide $Fe_3Pd$, Mn, fcc PdCo, $Fe_4Pt$, RuCo, CoMn, RuFe, and nanoparticles of bcc Co.

These and other objects of the invention may be accomplished by a process of making metal nanoparticles comprising the steps of: providing a precursor composition comprising at least one metallic compound and at least one organic compound; wherein the organic compound is selected from the group consisting of an ethynyl compound, a metal-ethynyl complex, and combinations thereof; wherein the precursor composition is a liquid or solid at room temperature; and heating the precursor composition under conditions effective to produce metal nanoparticles.

The invention further comprises a process of making metal nanoparticles comprising the steps of: providing a precursor composition comprising a polymer and a metallic component; wherein the polymer has crosslinked ethynyl groups; wherein the metallic group is bonded to the polymer, combined with the polymer, or combinations thereof; and heating the precursor composition under conditions effective to produce metal nanoparticles.

The invention further comprises a metal nanoparticle composition comprising metal nanoparticles and a carbon matrix selected from the group consisting of polymer (linear or crosslinked), amorphous carbon, carbon nanotubes, carbon nanoparticles, and combinations thereof; wherein the metal nanoparticle composition is rigid.

The invention further comprises $Fe_3Pd$, fcc Mn, fcc PdCo, $Fe_4Pt$, hcp RuCo, CoMn, RuFe, and nanoparticles of bcc Co.

DETAILED DESCRIPTION OF THE PREFERRED EMBODIMENTS

Figure 1:
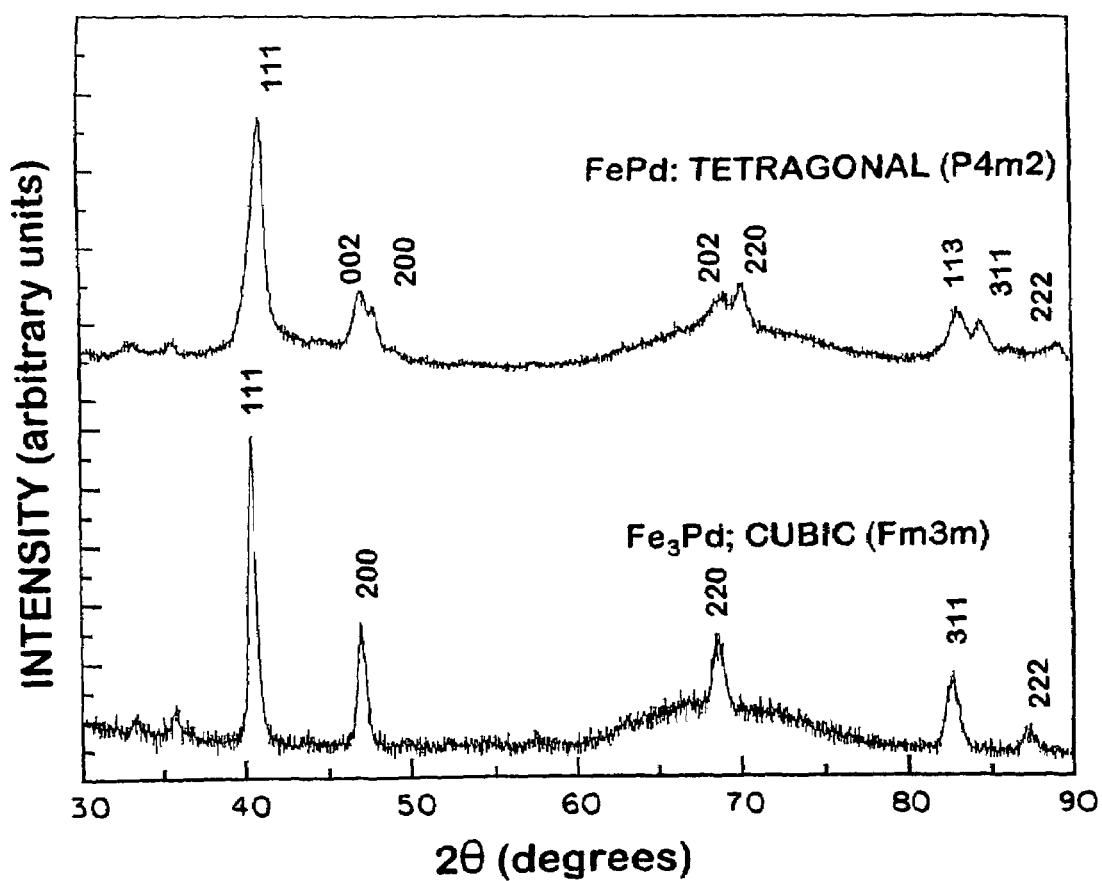
FIG. 1 illustrates x-ray reflection scans of FePd and $Fe_3Pd$ nanoparticles.

The invention can allow for the synthesis of metal nanoparticles in bulk material. This may be caused by melting of the starting materials to create a solid material in which the metal nanoparticles are made.

The process of the invention comprises two steps: providing a precursor composition and heating the precursor composition. In the step of providing a precursor composition, the precursor composition comprises at least one metallic compound and at least one organic compound. In the heating step, the precursor composition is heated under conditions effective to produce metal nanoparticles.

Providing Step

The precursor composition comprises one or more compounds, some or all of which are metallic compounds and some or all of which are organic compounds. The precursor composition may comprise a single compound that is both a metallic compound and an organic compound. Either the metallic compound, the organic compound, or both can be an aromatic compound. The precursor composition is a liquid or solid at room temperature. It should be understood that any reference to a compound can refer to one compound or to a combination of different compounds. The same is also true for any functional group, element, or component.

Any concentrations of the compounds that result in the formation of metal nanoparticles can be used. Generally, the higher the metal content of the precursor composition, the higher the yield of metal nanoparticles may be. High levels of metal may result in a precursor composition that does not melt, which may result in a metal nanoparticle composition that is a powder. Lower levels of metal may result in a rigid metal nanoparticle composition.

The metallic compound contains at least one metal atom. Suitable metals can include, but are not limited to, transition metals, iron, cobalt, nickel, ruthenium, osmium, molybdenum, tungsten, yttrium, lutetium, copper, manganese, chromium, zinc, palladium, silver, platinum, tin, tellurium, bismuth, germanium, antimony, aluminum, indium, selenium, cadmium, gadolinium, hafnium, magnesium, titanium, lanthanum, cerium, praseodymium, neodymium, terbium, dysprosium, holmium, erbium, and combinations thereof.

The metallic compound can be selected from, but is not limited to, the group consisting of a metallocenyl compound, a metal salt, a metal-ethynyl complex, and combinations thereof. More than one of these types of compounds can be present, whether in the same compound or in a combination of multiple compounds. For example, hexacarbonyl dicobalt complex of 1,4-bis(ferrocenyl)butadiyne can be used as a metallic compound having both a metallocenyl group and a metal-ethynyl complex. Hexacarbonyl dicobalt complex of 1,2,4,5-tetrakis(phenylethynyl)benzene and 1-(ferrocenylethynyl)-4-(phenylethynyl)benzene is an example of a combination of a metal-ethynyl complex and a metallocenyl compound.

Suitable metallocene compounds include, but are not limited to, a ferrocenyl compound, a metallocenylethynyl compound, 1,4-bis(ferrocenyl)butadiyne, a metallocenyl-ethynylaromatic compound, 1,3-bis(ferrocenylethynyl)benzene, 1,4-bis(ferrocenylethynyl)benzene, 1-ferrocenylethynyl)-3-(phenylethynyl)benzene, 1-(ferrocenylethynyl)-4-(phenylethynyl)benzene, 1,3,5-tris(ferrocenylethynyl)benzene, a metallocenylethynyl phosphine metal salt, bis(ferrocenylethynyl)-bis(triphenylphosphine)nickel, bis(ferrocenylethynyl)-bis(triethylphosphine)palladium, bis(ferrocenylethynyl)-bis(triethylphosphine)platinum, and combinations thereof. Examples 1-2 illustrate the synthesis of certain metallocenyl compounds.

The metal-ethynyl complex can be the metallic compound, the organic compound, or both. As used herein, the term "ethynyl" includes both ethynyl groups and ethynylene groups. The term "metal-ethynyl complex group" refers to only that part of a metal-ethynyl complex containing the ethynyl group and the metal group. Suitable metal-ethynyl complexes include, but are not limited to, a metal carbonyl-ethynyl complex, hexacarbonyl dicobalt complex of 1,2,4,5-tetrakis(phenylethynyl)benzene, hexacarbonyl diiron complex of 1,2,4,5-tetrakis(phenylethynyl)benzene, nonacarbonyl, triruthenium complex of 1,2,4,5-tetrakis(phenylethynyl)benzene, a metal carbonyl-metallocenylethynyl complex, hexacarbonyl dicobalt complex of 1,4-bis(ferrocenyl)butadiyne, hexacarbonyl dicobalt complex of 1-(ferrocenylethynyl)-4-(phenylethynyl)benzene, hexacarbonyl dicobalt complex of 1-(ferrocenylethynyl)-3-(phenylethynyl)benzene, and combinations thereof. Examples 3-15 illustrate the synthesis of certain metal-ethynyl complexes.

The metal-ethynyl complex can be a mixture of compounds, even when referred to in singular form. This can be the case when the metal-ethynyl complex is synthesized from a compound having more than one ethynyl group. For example, 1:10 hexacarbonyl dicobalt complex of 1,4-bis(ferrocenyl)butadiyne refers to a combination of compounds containing about one mole of metal-ethynyl complex groups for every ten moles of reacted and unreacted 1,4-bis(ferrocenyl)butadiyne. The descriptor "1:10" is the molar ratio of the complex. The combination can include 1,4-bis(ferrocenyl)butadiyne with two metal-ethynyl complex groups, 1,4-bis(ferrocenyl)butadiyne with one metal-ethynyl complex group, and unreacted 1,4-bis(ferrocenyl)butadiyne. The metal-ethynyl complex can also be a single compound. An example of this is 2:1 hexacarbonyl dicobalt complex of 1,4-bis(ferrocenyl)butadiyne, where every ethynyl group is in a metal-ethynyl complex group. Any recitation of a metal-ethynyl complex that omits the molar ratio refers to all molar ratios of the complex.

Suitable metal salts include, but are not limited to, a metal carbonyl salt, nonacarbonyl diiron, octacarbonyl dicobalt, dodecacarbonyl triruthenium, hexacarbonyl tungsten, a phosphine metal salt, bis(triphenylphosphine)nickel, bis(triethylphosphine)palladium, bis(triethylphosphine)platinum, dicarbonyl bis(triphenylphosphine)nickel, palladium (II) acetylacetonate, manganese (III)-2,4-pentanedionate, cyclopentadienyl tungsten tricarbonyl dimer, and combinations thereof.

The metal content of the precursor composition may be below about 1% by weight. Higher amounts of metal may also be used. The choice of metallic compound can influence the yield and nature of the metal nanoparticles. The choice of metal can also influence the electromagnetic properties and other properties of the metal nanoparticle composition.

The organic compound is selected from the group consisting of an ethynyl compound, a metal-ethynyl complex, and combinations thereof. The term "organic compound" refers to an organic compound that is substantially free of silicon. The ethynyl compound is an organic compound having one or more ethynyl groups. The ethynyl compound can also be the same compound as the metal-ethynyl complex. The metal-ethynyl complex is described above. This can occur when the organic compound contains both one or more ethynyl groups and one more metal-ethynyl complex groups. 1:1 Hexacarbonyl diiron complex of 1,2,4,5-tetrakis(phenylethynyl)benzene is an example of such a compound. The organic compound can also be a monomer or a linear polymer containing an ethynyl group or a metal-ethynyl complex.

Suitable ethynyl compounds include, but are not limited to, an ethynylaromatic compound, 1,2,3-tris(phenylethynyl)benzene, 1,2,4-tris(phenylethynyl)benzene, 1,3,5-tris(phenylethynyl)benzene, 1,2,3,4-tetrakis(phenylethynyl)benzene, 1,2,3,5-tetrakis(phenylethynyl)benzene, 1,2,4,5-tetrakis(phenylethynyl)benzene, 1,2,3,4,5-pentakis(phenylethynyl)benzene, and 1,2,3,4,5,6-hexakis(phenylethynyl)benzene.

The choice of organic compound can influence the yield and nature of the metal nanoparticles, as well as the processing window of the precursor composition.

The compounds of the precursor composition can be combined in any way in which the heating step results in the formation of metal nanoparticles. Suitable methods include, but are not limited to, mechanical mixing, solvent mixing, and partial complexation. Partial complexation refers to forming metal-ethynyl complex groups from a portion of the ethynyl groups in the ethynyl compound. The result is a combination of compounds, as described above, that are already mixed. Precursor compositions having a single compound may not require mixing.

Heating Step

In the heating step, the precursor composition is heated under conditions effective to produce metal nanoparticles. The heating may be done in an inert atmosphere. Depending on the heating conditions, the metal nanoparticle composition may also be a polymer composition, a carbon nanoparticle composition, and/or a carbon nanotube composition. Compositions containing combinations of any of polymer, carbon nanoparticles, and carbon nanotubes are possible.

A number of processes may occur during the heating step, including melting, crosslinking, degradation, metal nanoparticle formation, carbonization, carbon nanoparticle formation, and carbon nanotube formation. The sequence of the processes may change and various processes may occur simultaneously. Any descriptions of reaction mechanisms are proposed mechanisms that do not limit the scope of the claimed processes.

Initially, the precursor composition, if a solid, may melt. Alternatively, a liquid precursor composition may become less viscous. In either case, diffusion through the precursor composition may be enhanced. The viscosity of the melt, as well as the time that the precursor composition remains a melt may affect the properties of the metal nanoparticle composition. Precursor compositions containing a high percentage of metal may not melt at all. This may result in a powdered metal nanoparticle composition.

At low temperatures, crosslinking may occur between the non-complexed ethynyl groups in the organic compound. This converts the organic compound into a polymer. Crosslinking, as used herein, refers to a reaction joining one ethynyl group to another, whether the result is an oligomer, a linear polymer, or a thermoset. The reaction is considered crosslinking if an ethynyl groups reacts with at least one other ethynyl group. The entire composition may then be referred to as a polymer composition. When the organic compound has multiple ethynyl groups capable of crosslinking, the polymer composition may be a thermoset. Crosslinking may begin at about 250° C. Heat treatment to about 400° C. may result in virtually no remaining ethynyl groups, in that they are all crosslinked. There may be little weight loss due to the crosslinking, but there may be some shrinking. Crosslinking can be important because it can make the composition into a solid material. Example 16-19 illustrate the production of polymer composition, including thermosets, which do not contain metal nanoparticles.

Another process that may occur during heating is that the metallocenyl group, metal salt, and/or metal-ethynyl complex group may decompose, releasing elemental metal. The elemental metal may coalesce into metal nanoparticles. Metal nanoparticles may begin to form at about 300° C. The size of the metal nanoparticles may depend on the mobility of the metal atoms, which in turn may depend on the viscosity of the precursor composition and the heating conditions. It is also possible for some or all of the elemental metal to not coalesce and remain as elemental metal.

Metallocenyl groups may tend to degrade at lower temperatures, such as about 300° C. Some metallic compounds may degrade even below the melting point of the precursor composition. Some metal salts and metal-ethynyl complex groups may degrade at higher temperatures. This may affect the size of the metal nanoparticles. A metal salt or a metal-ethynyl complex group may degrade after crosslinking is complete and the composition is a solid thermoset. This may reduce the mobility of the metal atoms and form smaller nanoparticles.

A metallocenyl group may degrade before crosslinking is complete while the composition has low viscosity. The metal atoms may have higher mobility in this low viscosity composition and form larger nanoparticles. However, if the heating is fast enough, a thermoset may form before the metal nanoparticles have time to grow in size.

The size of the metal nanoparticles may also be determined by the molar ratio of metal atoms in the metallic compound and by the precursor composition. Various molar ratios of the organometallic complex and/or organometallic complexes of 1,2,4,5-tetrakis(phenylethynyl)benzene can be used as the precursor composition for the formation of metal nanoparticle compositions. As the amount of organometallic compound content is increased, the size of the metal nanoparticles can increase in size and the distance between the nanoparticles would be expected to diminish. In addition, metal nanoparticles or an alloy of different metals forming metal nanoparticles can be produced by adding various amounts of metal compound(s) and the 1,2,4,5-tetrakis (phenylethynyl)benzene followed by mixing neat or in a solution using a solvent. The composition formed from the organometallic compound(s) and/or metal compound(s) and 1,2,4,5-tetrakis(phenylethynyl)benzene is heated to elevated temperatures to produce the metal nanoparticles. A 1:20 compound may produce smaller nanoparticles than an otherwise identical 1:10 compound under the same conditions. Other aromatic acetylene-containing compounds can be used in place of 1,2,4,5-tetrakis(phenylethynyl)benzene to yield metal containing polymeric and carbonaceous metal nanoparticle compositions.

After the metal-ethynyl complex groups degrade, more ethynyl groups may be available for crosslinking, increasing the viscosity of the composition. This may also occur simultaneously with carbonization.

If the composition is only heated enough to form the polymer composition the polymer composition may be a magnetic polymer, depending on the metal component. The magnetic polymer may contain metal nanoparticles and/or elemental metal in an insulating matrix. The magnetic polymers may retain excellent structural integrity and high thermal stability. Different polymers with various concentrations and metal particle sizes may have distinct properties, which would be expected to affect the characteristics of the final metal containing systems. Alternatively, the polymer composition may be a conducting polymer. This can occur when the metal concentration is high enough that transport can occur among the metal nanoparticles and/or elemental metal.

Carbonization may occur when the heating is continued. This may cause the formation of carbon nanotubes and/or carbon nanoparticles. These processes may occur at or above a temperature of from about 500° C. to about 1600° C. The amount of carbon nanotubes and carbon nanoparticles produced can be affected by the reactants, the heating conditions, and the properties of the metal nanoparticles.

Higher temperatures and/or longer heating times may be required to form carbon nanotubes than to form carbon nanoparticles. When the heating is sufficient, the metal nanoparticles may catalyze the assembly of carbon nanoparticles into carbon nanotubes. Carbon nanotubes may also grow from free carbon or from the organic compound. It is also possible to form metal carbide nanoparticles. Example 20 illustrates forming a composition containing nickel carbide nanoparticles.

Examples 21-95 illustrate processes that form metal nanoparticle compositions comprising cobalt, iron, ruthenium, manganese, tungsten, cobalt-iron alloy, iron-ruthenium alloy, iron-nickel alloy, cobalt-ruthenium alloy, cobalt-palladium alloy, iron-palladium alloy, iron-platinum alloy, and cobalt-manganese alloy. Metal nanoparticles comprising other metals may also be made. Many of the metal nanoparticles compositions also comprise carbon nanotubes. The carbon nanotubes may be SWNT's or MWNT's. The diameter of the tubes may be controlled by the size of the metal nanoparticles. Larger metal nanoparticles may result in larger diameter carbon nanotubes, such as MWNT's. The metal nanoparticles can be in a polymeric, amorphous carbon, graphite, or highly ordered carbon domain depending on the heating conditions. The metal nanoparticle composition may also comprise any of crosslinked polymer, carbon nanoparticles, and elemental metal.

The metal nanoparticle composition may have magnetic properties that are caused by the metal nanoparticles, the carbon nanotubes (if present), or both. The metal nanoparticle composition may be a magnetic semiconductor. In some cases, metal may react with the carbon nanotubes, the carbon nanoparticles, or the carbon domain. Examples 20, 30, 37, 38, 41, and 42 illustrate cases where very little free metal was observed. The metal may have reacted with carbon, including intercalation of metal atoms and/or nanoparticles into the lattice of the carbon nanotubes.

Alternative Process

An alternative process comprises the steps of providing a precursor composition comprising a polymer and a metallic component and heating the precursor composition under conditions effective to produce metal nanoparticles.

The precursor composition of this process can be similar to the polymer composition. The precursor composition comprises a polymer having crosslinked ethynyl groups and a metallic component. The polymer can be a linear polymer or a thermoset. The metallic component can be the same as those found in the metallic compound and the decomposition products thereof. The metallic compound can be selected from, but is not limited to, a metallocenyl group, a metal-ethynyl complex group, a metal salt, and elemental metal. The metallocenyl group and the metal-ethynyl complex group may be bonded to the polymer or found in compounds combined with the polymer. Combined can refer to, but is not limited to, the compound or component being mixed, embedded, or dispersed in the polymer. The elemental metal may be the result of degradation of metallic groups and may be combined with the polymer, rather than bonded to it. The metal salt may also be combined with the polymer. Combinations of these groups are also possible.

The metal can be any metal described or recited above and combinations thereof. The metallocenyl group can be, but is not limited to, ferrocenyl. The metal-ethynyl complex group can be, but is not limited to, hexacarbonyl dicobalt-ethynyl complex group, hexacarbonyl diiron-ethynyl complex group, nonacarbonyl triruthenium-ethynyl complex group, and combinations thereof. The metal salt can be, but is not limited to, metal carbonyl salt, nonacarbonyl diiron, octacarbonyl dicobalt, dodecacarbonyl triruthenium, hexacarbonyl tungsten, a phosphine metal salt, bis(triphenylphosphine)nickel, bis(triethylphosphine)palladium, bis(triethylphosphine)platinum, dicarbonyl bis(triphenylphosphine)nickel, palladium(II) acetylacetonate, manganese (III)-2,4-pentanedionate, cyclopentadienyl tungsten tricarbonyl dimer, and combinations thereof. The elemental metal can comprise any metal described or recited above and combinations thereof.

Metal Nanoparticle Compositions

The invention also comprises a metal nanoparticle composition comprising metal nanoparticles dispersed homogenously in a matrix. The matrix is selected from the group consisting of ethynyl polymer, crosslinked ethynyl polymer, amorphous carbon, carbon nanotubes, carbon nanoparticles, graphite, and combinations thereof.

The metal nanoparticle composition can be rigid, The term "rigid" is used to described a coherent, solid, substantially nonporous mass that undergoes little elastic deformation, but can fracture when enough stress is applied. A thin fiber or film of the metal nanoparticle composition may be slightly bendable, but is brittle rather than flexible. This is in contrast to a powder or a crumbly material, which is not cohesive. It also differs from a rubbery material, which undergoes elastic deformation. It also differs from a paper-like material, which is flexible.

The metal nanoparticle composition is made by processes similar to those above. The steps are providing a precursor composition and heating the precursor composition.

In the providing step, the precursor composition is a liquid or solid at room temperature and comprises at least one metallic component and at least one organic component. The organic component can be, but is not limited to, an ethynyl compound, a metal-ethynyl complex, and combinations thereof. In that case, the metallic component can be, but is not limited to, a metallocenyl compound, a metal salt, a metal-ethynyl complex, and combinations thereof. The organic component can also be a polymer having crosslinked ethynyl groups. In that case, the metallic component is bonded to the polymer, combined with the polymer, or both; and can be, but is not limited to, a metallocenyl group, a metal-ethynyl complex group, a metal salt, elemental metal, and combinations thereof.

Precursor compositions that melt can result in a rigid metal nanoparticle composition. When the precursor composition does not melt, the resulting metal nanoparticle composition may be soft or powdery.

The heating step and all other aspects of the process of making the metal nanoparticle composition are as described above.

Metal nanoparticles sized from 1-25 nm can be made. Other sizes may also be made. The metal nanoparticles may also be intercalated in the carbon lattice. This can result in a metal nanoparticle composition that is a magnetic semiconductor. An example of a cobalt nanoparticle composition showed magnetic semiconductor behavior from about −100 to about 0° C. and semimetallic behavior above about 0° C. The metal nanoparticle composition may also be superconductor.

It is possible to make a shaped article that contains metal nanoparticle made in situ in the article. Processes using compounds having one or more ethynyl groups and/or metal ethynyl complex groups may be shaped. This is because such organic compounds may form a thermoplastic or thermoset. If the precursor composition is a liquid, it can be formed into the desired shape before or during heating, but before formation of a solid polymer or carbon composition, as the shape may then be fixed. A solid precursor composition may be melted before forming into a shape or may be pressed into a shape. The possible shapes include, but are not limited, to, a solid article, a film, and a fiber. A fiber can be formed by drawing the fiber from the melt state, followed by metal nanoparticle formation.

A film of the metal nanoparticle composition may comprise a plurality of layers containing different concentrations of metal nanoparticles. One way to make this is to use a plurality of precursor compositions comprising different concentrations of compounds and/or different metallic compounds and organic compounds. The precursor compositions are cast in adjacent layers before formation of the metal nanoparticle composition. This can be done from a melt or from a solution.

The metal nanoparticle composition may have useful structural, catalytic, electric, medical, or magnetic properties, making them useful for many applications. The electromagnetic properties may be due to the presence of the metal, the carbon nanotubes, if present, or both.

A drug delivery system comprising the metal nanoparticle composition may be made. This may be done by, but is not limited to, grinding the metal nanoparticle composition to a powder and mixing the powder with the drug, or dispersing the metal nanoparticle composition in solution with a drug. The drug can adsorb into the carbon domain or interact with the metal nanoparticles. A suspension of the powder with the drug can then be injected or otherwise placed into a patient. The magnetic properties of the metal nanoparticle composition may allow for the movement of a drug through a patient by external application of magnetic fields. The drug composition can thereby be contained in a specific region of the body. Over time, the drug composition may decompose, releasing the drug in the region slowly and over an extended period, without exposing the entire body to the drug. This may be useful in the treatment of tumors by chemotherapy. Drugs can be contained in a tumor over an extended period, without causing toxic effects in the rest of the body. Drugs can also be directed to an area of excessive bleeding to stop the bleeding. Such systems using other materials are known in the art.

A microelectronic device comprising the metal nanoparticle composition may be made. One possible method to make the microelectronic device is to make an ink comprising the precursor composition or the metal nanoparticle composition. The ink can be applied to the device by any means for forming a pattern from an ink. Such means are known in the art. If the ink comprises the precursor composition, the device can then be heated to produce metal nanoparticle circuit elements in a desired pattern. Such a device may take advantage of the unique electrical and magnetic properties of the metal nanoparticles.

An electrode comprising the metal nanoparticle composition may also be made. One possible method to make the electrode is to grind the metal nanoparticle composition to a powder or otherwise disperse the metal nanoparticles. The metal nanoparticles may then be deposited on a substrate by methods known in the art. Alternatively, the electrode can be made at the same time as the metal nanoparticle composition by forming the metal nanoparticle composition as a shaped article in the shape of the electrode. The electrode can be a fuel cell electrode. Fuel cell electrodes are known in the art and may contain carbon and platinum on a membrane. The metal nanoparticle composition may already contain sufficient platinum from the metallic compound or additional platinum may be deposited into the composition. The metal nanoparticle composition may be deposited on a fuel cell membrane by methods known in the art, or may be made in situ on the membrane.

A ferrofluid comprising the metal nanoparticle composition may be made. A ferrofluid is fluid with magnetic properties. The flow of a ferrofluid may be influenced by an applied magnetic field. One possible way to make the ferrofluid is to grind the metal nanoparticle composition to a powder and place the powder into a colloidal solution.

Devices that can be made from the metal nanoparticle composition include, but are not limited to, electrical components, including fibers and films; magnetic components; sensors; photovoltaic devices; and batteries. Any of these devices may include an electrical or magnetic component made as a shaped article of the metal nanoparticle composition, or can be made from already formed metal nanoparticle composition. The designs of such devices are known in the art.

Metal Phases and Intermetallic Phases

New metal phases and intermetallic phases can be made by the process of the invention. The phases may be a pure metal or alloy in a new crystal form, a new alloy, or an alloy with a new molar ratio. The metal phases and intermetallic phases have metal atoms arranged in a crystal structure on an atomic level.

Possible phases include, but are not limited to, $Fe_3Pd$, fcc Mn, fcc PdCo, $Fe_4Pt$, RuCo, CoMn, and RuFe. Nanoparticles of bcc Co can also be made. Cobalt in bcc form had previously been made only as a film. $Fe_3Pd$ may be suitable for use in both soft and hard magnets. Methods for separating the metal nanoparticles from the carbon of the metal nanoparticle composition are known in the art. By use of such methods, purified nanoparticles may be obtained.

Formation of these phases may be possible because of the release of metal atoms upon degradation of the metallic compound. The atoms may be able to assemble into the phase on an atom-by-atom basis, rather then by bulk mixing. This allows the formation of alloys of otherwise immiscible metals, as well as new crystal structures of previously made metals and alloys.

The metal phases and intermetallic phases may have desirable electromagnetic properties. For example CoMn can be magnetoresistive. This is because cobalt is ferromagnetic and manganese is anti-ferromagnetic. The combination of the two metals is therefore magnetoresistive.

All the metal phases and intermetallic phases described below were made by the processes of the invention. The structure and identity of the metal nanoparticles can be determined by x-ray reflection. X-ray reflection methods and methods of analyzing the results are known in the art. The Figures include x-ray reflection scans of metal nanoparticle compositions of some of the Examples, or similarly made compositions. Some of the scans also include peaks indicating the presence of carbon nanotubes and/or carbon nanoparticles.

FIG. 1 illustrates x-ray reflection scans of FePd and $Fe_3Pd$ nanoparticle compositions. These compositions can be made by the methods such as those of Examples 86-91. The FePd nanoparticles had a tetragonal structure, lattice parameters of a32 3.789 Å and c=3.8496 Å, and an average particle size of 7.7 nm. $Fe_3Pd$ is an intermetallic phase that had not previously been observed. The $Fe_3Pd$ nanoparticles shown in the scan had a cubic structure, a lattice parameter of a=3.865 Å, and an average particle size of 8.3 nm. Other structures, lattice parameters, and particle sizes may be possible, as well as purified Fe₃Pd.

Figure 2:
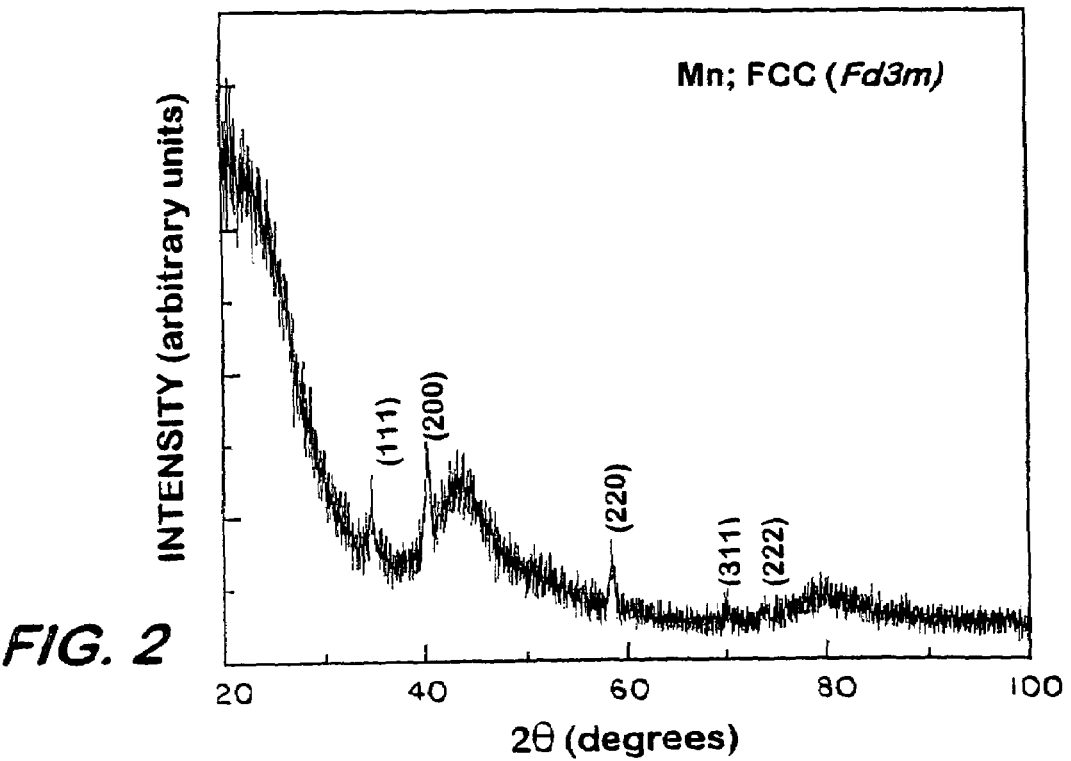
FIG. 2 illustrates an x-ray reflection scan of fcc Mn nanoparticles.

FIG. 2 illustrates an x-ray reflection scan of a fcc Mn nanoparticle composition. These compositions can be made by the methods such as those of Example 67. Mn in fcc form is a metal phase that had not previously been observed. The fcc Mn nanoparticles shown in the scan had a lattice parameter of a=4.4787 Å, and an average particles size of 15.7 nm. Other lattice parameters and particle sizes may be possible, as well as purified fcc Mn.

Figure 3:
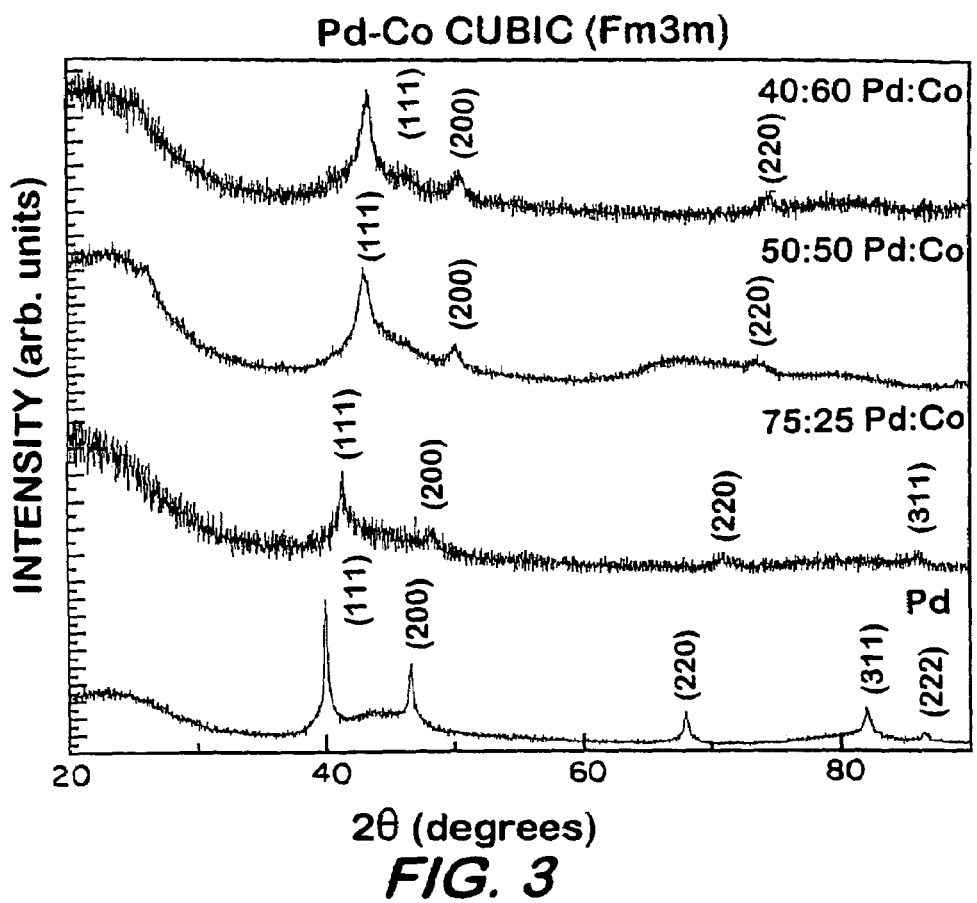
FIG. 3 illustrates x-ray reflection scans of PdCo and Pd nanoparticles.

FIG. 3 illustrates x-ray reflection scans of Pd and PdCo nanoparticle compositions. PdCo is an intermetallic phase that had not previously been observed in any molar ratio. These compositions can be made by the methods such as those of Examples 83-85. These scans used varying ratios of Pd and Co metallic compounds. These ratios are the molar ratios of the metallic compounds in the precursor composition. The Figure also shows the scan for one composition without Co. The table below shows that as the amount of Pd was increased, the lattice parameter and average particle size increased. The FePd nanoparticles shown in the scan had a cubic structure. Other structures, lattice parameters, and particle sizes may be possible, as well as purified PdCo.

| Pd/Co | a (Å) | size (nm) |
|---|---|---|
| 40/60 | 3.605 | 5.4 |
| 50/50 | 3.6368 | 5.41 |
| 75/25 | 3.7759 | 8.68 |
| 100/0 | 3.913 | 24.8 |

Figure 4:
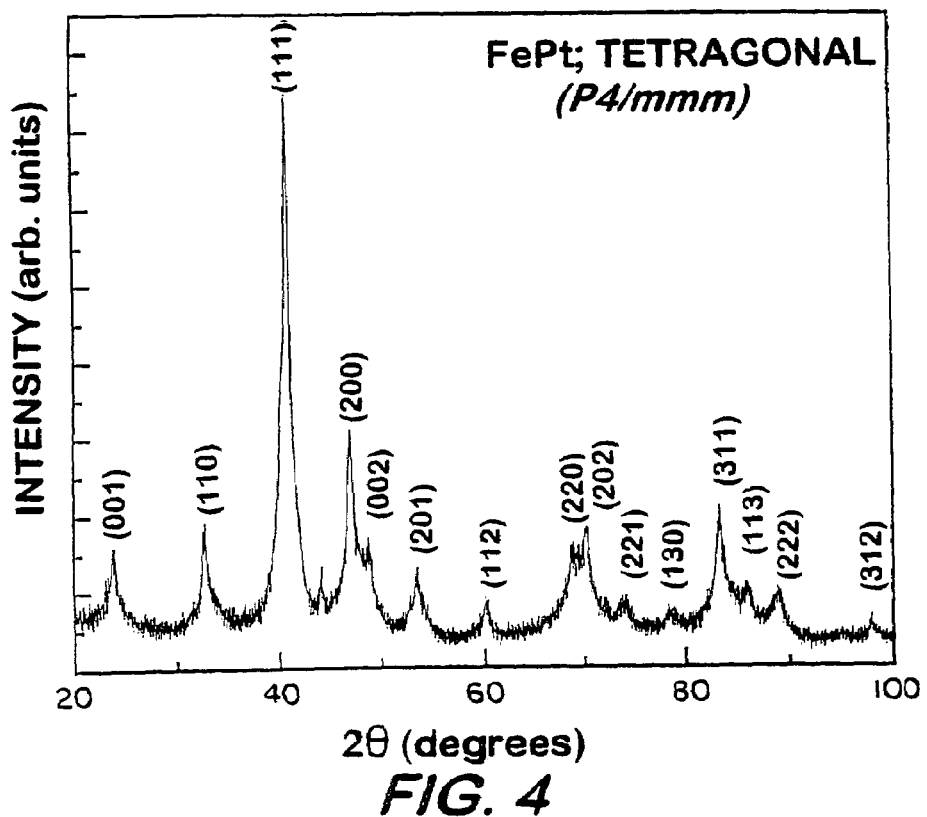
FIG. 4 illustrates an x-ray reflection scan of $Fe_4Pt$ nanoparticles

FIG. 4 illustrates an x-ray reflection scan of a Fe₄Pt nanoparticle composition. These compositions can be made by the methods such as those of Examples 92-93. Fe₄Pt is a metal phase that had not previously been observed. The Fe₄Pt nanoparticles shown in the scan had a tetragonal structure; lattice parameters of a=3.853 Å and c=3.713 Å, and an average particle size of 1.1 nm. Other structures, lattice parameters, and particle sizes may be possible, as well as purified Fe₄Pt.

Figure 5:
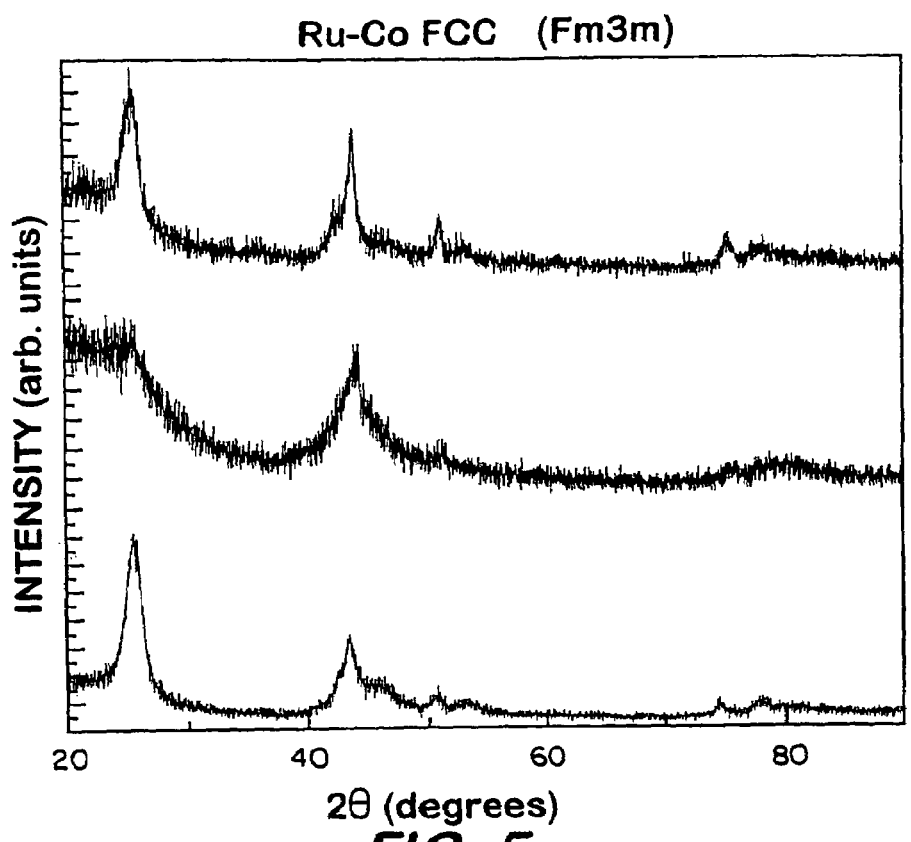
FIGS. 5 and 6 illustrate x-ray reflection scans of RuCo and Ru nanoparticles
Figure 6:
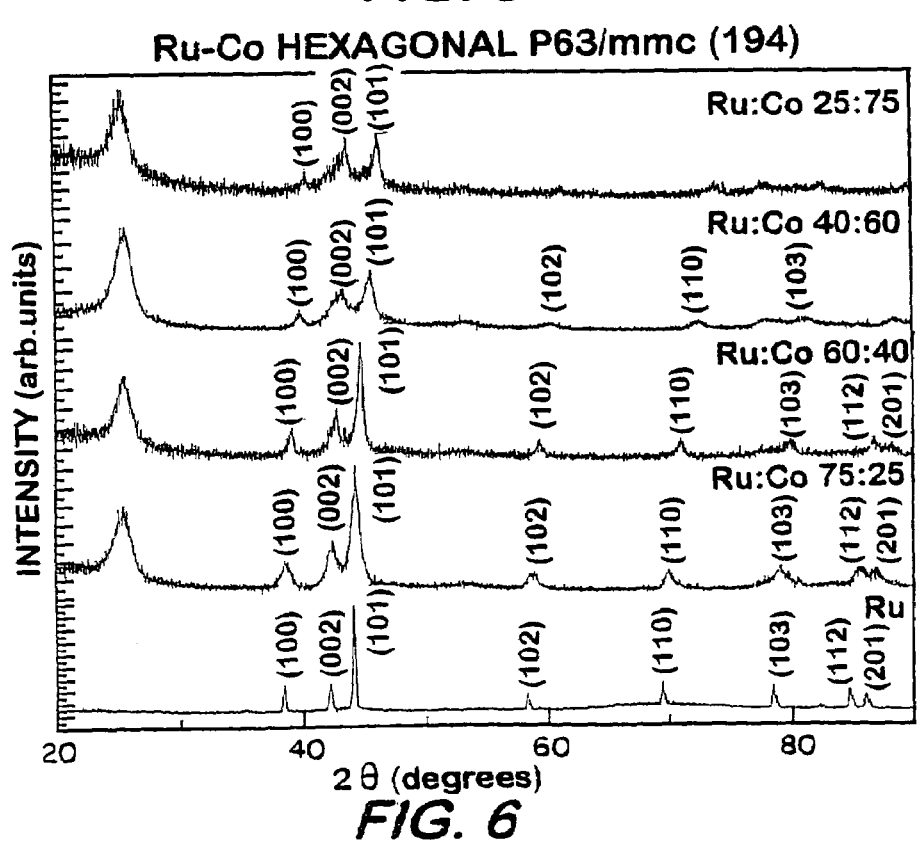
Figure 7:
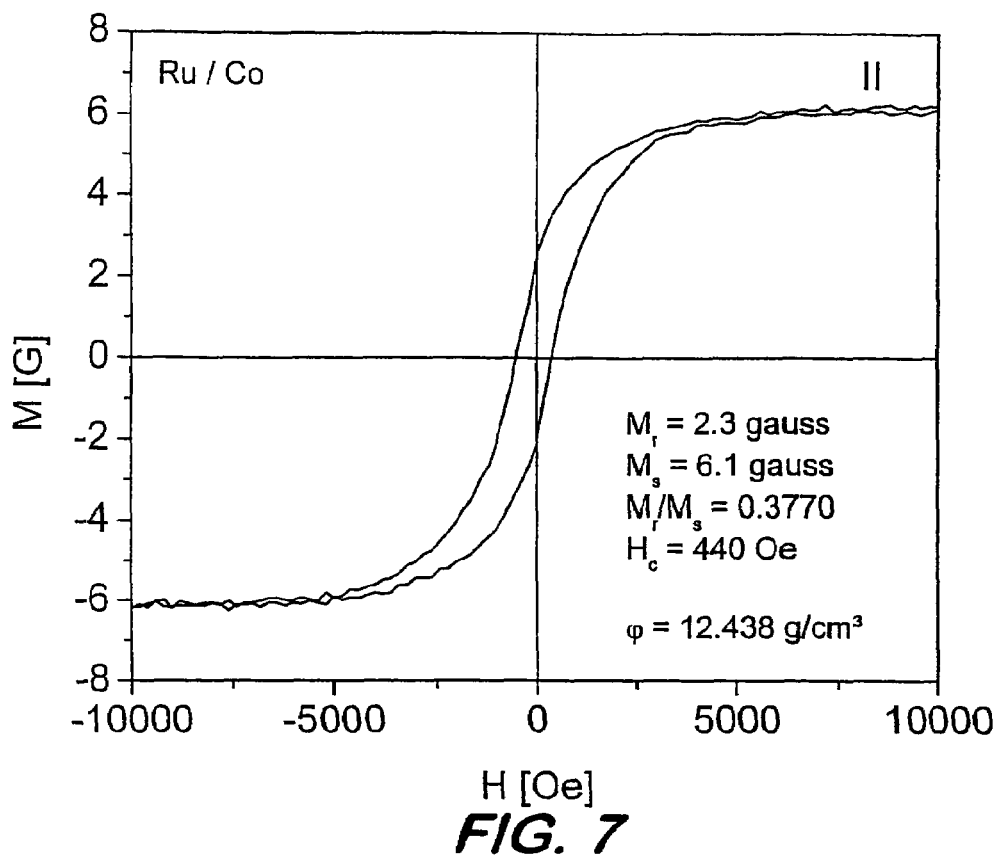
FIG. 7 illustrates the magnetic properties of RuCo nanoparticles.

FIGS. 5 and 6 illustrates x-ray reflection scans of Ru and RuCo nanoparticle compositions. These compositions can be made by the methods such as those of Examples 64-66 and 81-82. These scans used varying ratios of Ru and Co metallic compounds. These ratios are the molar ratios of the metallic compounds in the precursor composition. The Figure also shows the scan for one composition without Co. The table below shows that as the amount of Ru was increased, the structure changed from fcc to hcp. RuCo is a metal phase that had not previously been observed in any molar ratio. Other structure, lattice parameters, and particle sizes may be possible, as well as purified hcp RuCo. FIG. 7 illustrates the magnetic properties of 50/50 RuCo nanoparticles.

| Ru/Co | structure | a (Å) | c (Å) | size (nm) |
|---|---|---|---|---|
| 5/95 | fcc | 3.5971 | | 5.1 |
| 10/90 | fcc | 3.5488 | | 3.3 |
| 15/85 | fcc | 3.5632 | | 15.8 |
| 25/75 | hcp | 2.5672 | 4.1548 | 17 |
| 40/60 | hcp | 2.6062 | 4.1849 | 8.1 |
| 60/40 | hcp | 2.655 | 4.2241 | 16.9 |
| 75/25 | hcp | 2.6838 | 4.2641 | 11.1 |
| 100/0 | hcp | 2.7087 | 4.2919 | 22 |

Figure 8:
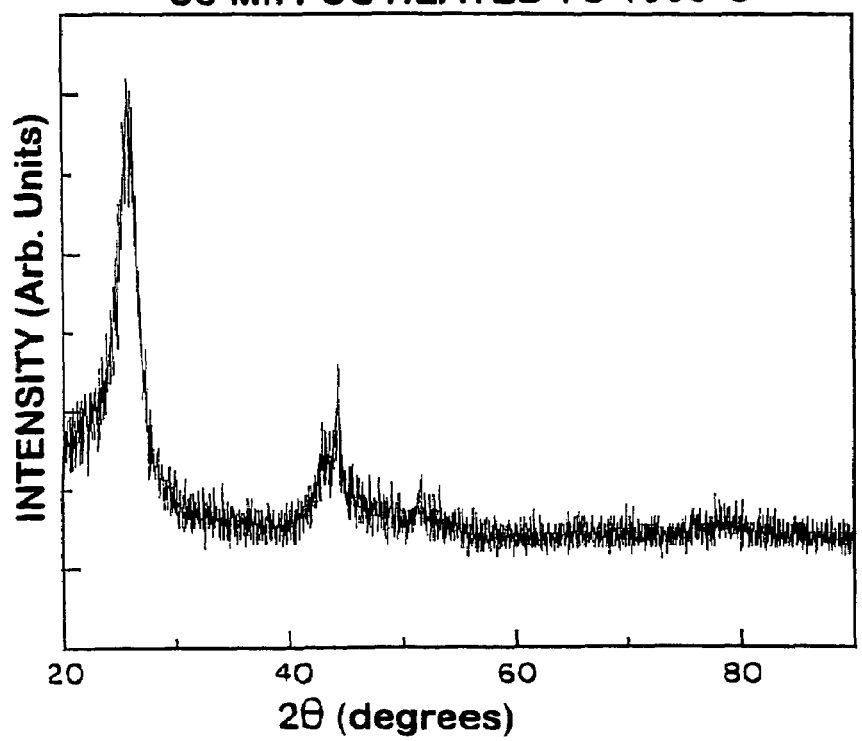
FIGS. 8 and 9 illustrate x-ray reflection scans of CoMn nanoparticles.
Figure 9:
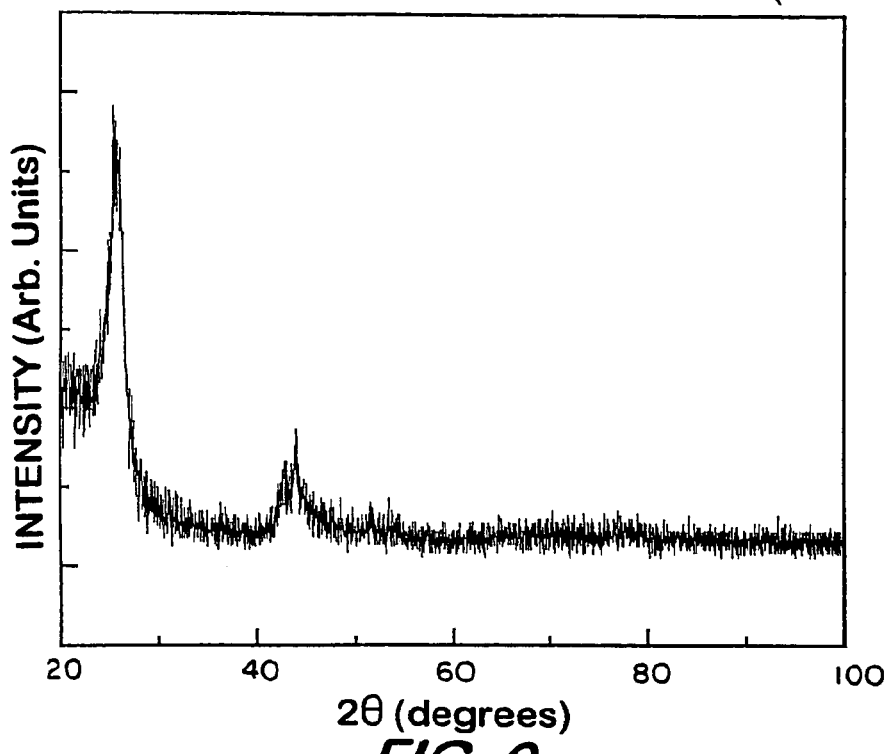

FIGS. 8 and 9 illustrate x-ray reflection scans of a CoMn nanoparticle compositions. These compositions can be made by the methods such as those of Examples 94-95. CoMn is an intermetallic phase that had not previously been observed in any molar ratio. The CoMn nanoparticles shown in the scan had a fcc structure. When heated to 1000° C., the lattice parameter was a=3.5707 Å and the average particle size was 6.4 nm. When heated to 1300° C., the lattice parameter was a=3.55 Å and the average particle size was 6.4 nm. Other structures, lattice parameters, and particle sizes may be possible, as well as purified CoMn.

Figure 10:
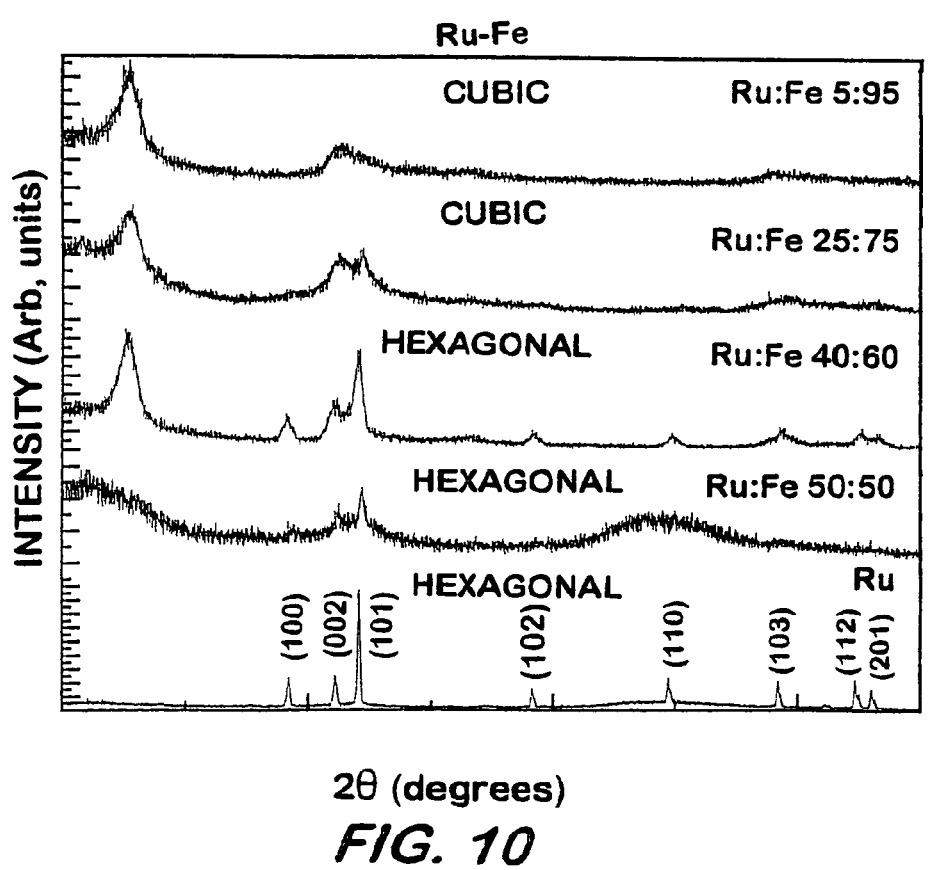
FIG. 10 illustrates x-ray reflection scans of RuFe nanoparticles.
Figure 11:
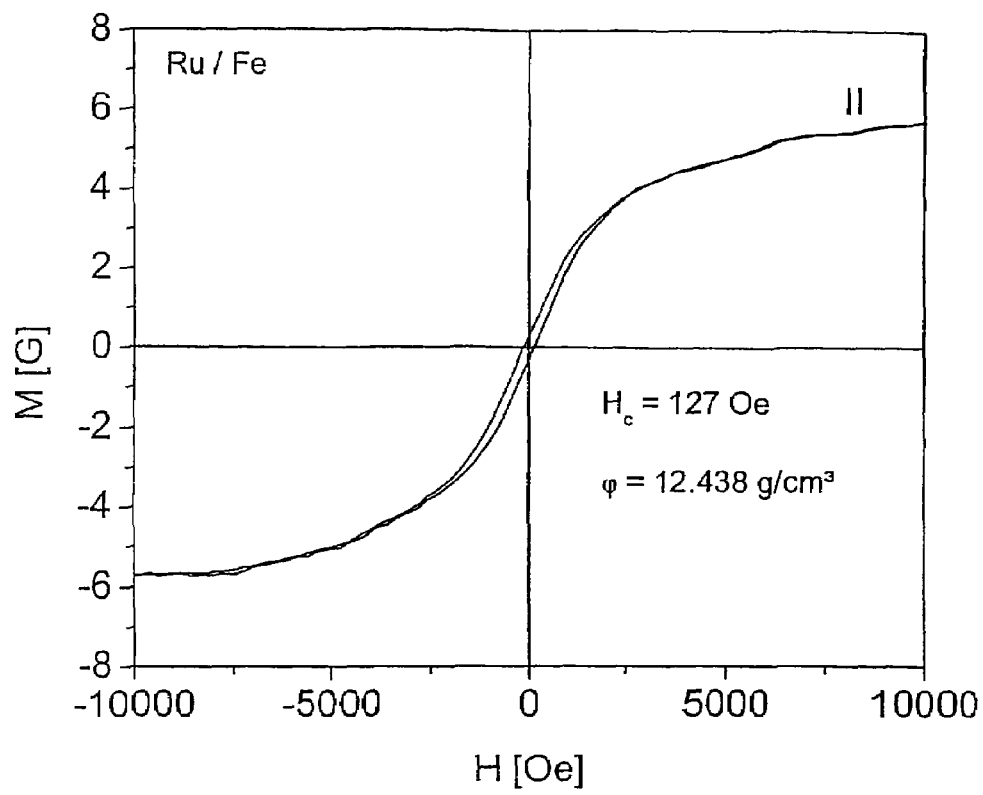
FIG. 11 illustrates the magnetic properties of RuFe nanoparticles.

FIG. 10 illustrates x-ray reflection scans of Ru and RuFe nanoparticle compositions. RuFe is a metal phase that had not previously been observed in any molar ratio. These compositions can be made by the methods such as those of Examples 64-66 and 76-77. These scans used varying ratios of Ru and Fe metallic compounds. These ratios are the molar ratios of the metallic compounds in the precursor composition. The Figure also shows the scan for one composition without Fe. The table below shows that as the amount of Ru was increased, the structure changed from fcc to hcp. Other lattice parameters and particle sizes may be possible, as well as purified RuFe. FIG. 11 illustrates the magnetic properties of 50/50 RuFe nanoparticles. This is noteworthy in that neither hcp Ru nor hcp Fe is magnetic, yet the hcp RuFe alloy is magnetic.

| Ru/Fe | structure | a (Å) | c (Å) | size (nm) |
|---|---|---|---|---|
| 5/95 | cubic | 2.91 | | 12.4 |
| 25/75 | cubic | 2.9823 | | 12.4 |
| 40/60 | hcp | 2.6941 | 4.277 | 10.0 |
| 50/50 | hcp | 2.700 | 4.2574 | 11.0 |
| 100/0 | hcp | 2.7086 | 4.2803 | 37 |

Figure 12:
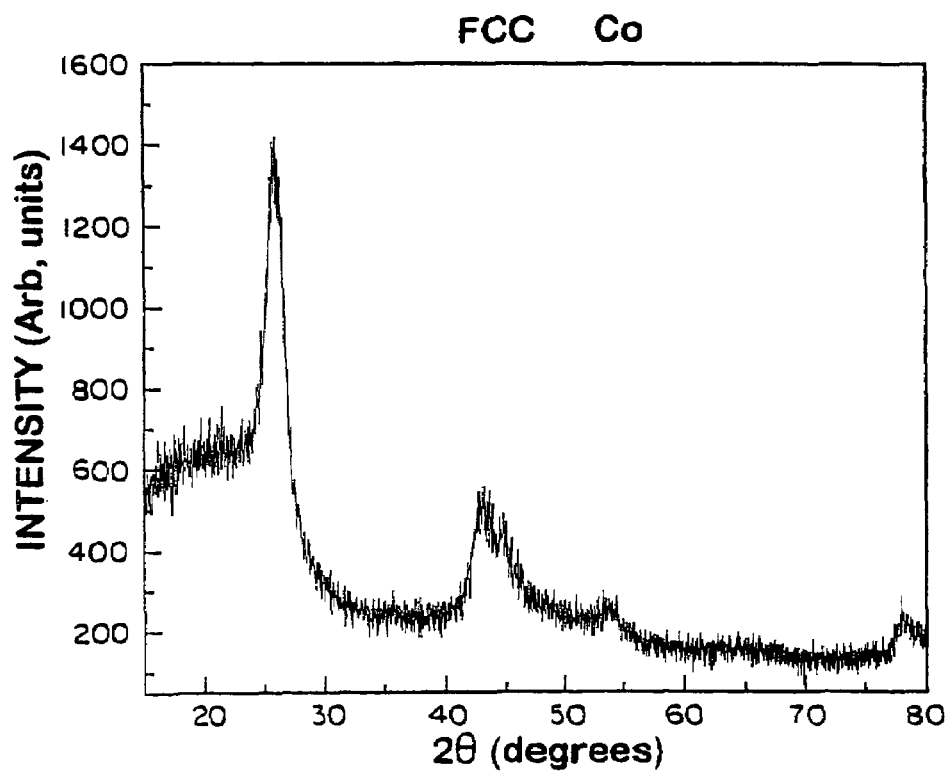
FIG. 12 illustrates an x-ray reflection scan of fcc Co nanoparticles

FIG. 12 illustrates an x-ray reflection scan of a fcc Co nanoparticle composition. These compositions can be made by the methods such as those of Examples 23-52. Co in the fcc form is a known metal phase. The fcc Co nanoparticles shown in the scan were made from the precursor composition having a small percentage of Co. The small peak at about 44° signifies fcc Co. The other large peaks signify carbon nanotubes.

Figure 13:
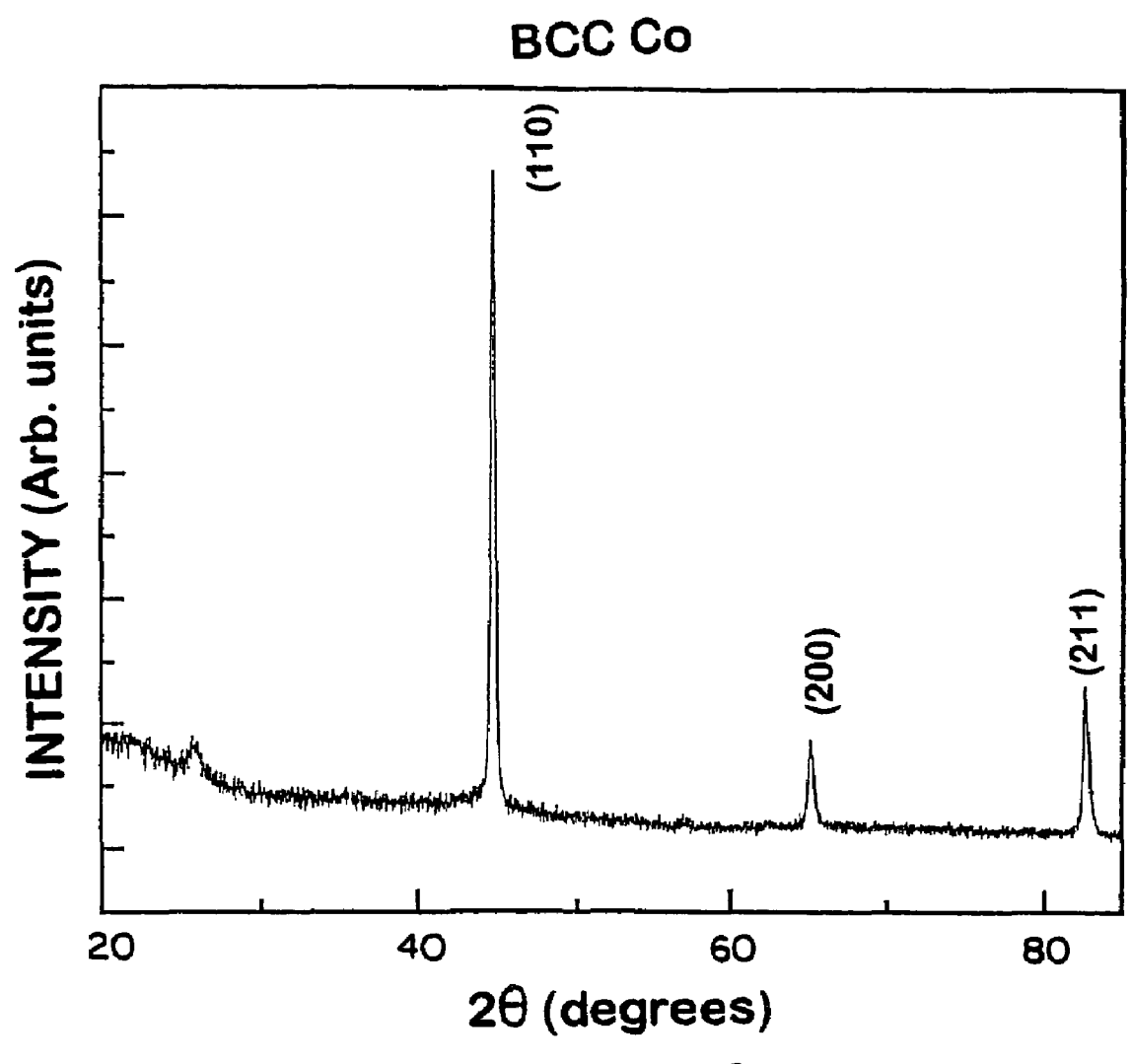
FIG. 13 illustrates an x-ray reflection scan of bcc Co nanoparticles

FIG. 13 illustrates an x-ray reflection scan of a bcc Co nanoparticle composition. These compositions can be made by the methods such as those of Examples 71-73 and 75. Co in bcc form is a metal phase that had not previously been observed. The bcc Co nanoparticles shown in the scan had a lattice parameter of a=2.848 Å and an average particle size of 20.5 nm. Other lattice parameters and particle sizes may be possible, as well as purified bcc Co.

Having described the invention, the following examples are given to illustrate specific embodiments of the invention. These specific examples are not intended to limit the scope of the invention described in this application.

I. SYNTHESIS OF COMPOUNDS

A. Synthesis of Metallocenyl Compounds

Example 1

Synthesis of bis(ferrocenylethynyl)-bis(triphenylphosphine)nickel—Ethynylferrocene (0.3495 g, 1.66 mmol) was placed in a 250 mL, round bottom flask with a side arm and cooled to −78° C. At this time, 1.6 mL of 1.6 molar n-BuLi was added with stirring for 1 hr while warming to room temperature. The solution was then cooled to −78° C. and $NiCl_2(PPh_3)_2$ (0.544 g, 0.83 mmol) in 20 mL of dry THF was added by cannula. The reaction mixture was allowed to warm to room temperature and stirred overnight. Upon removal of solvent at reduced pressure, the desire black product was isolated.

Example 2

Synthesis of bis(ferrocenylethynyl)-bis(triethylphosphine)palladium—Ethynylferrocene (0.3448 g, 1.64 mmol) was placed in a 250 mL round bottom flask with a side arm and cooled to −78° C. At this time, 0.74 mL of n-BuLi (0.95 equivalent) was added with stirring for 1 hr while warming to room temperature. The solution was then cooled to −78° C. and $PdCl_2(PEt_3)_2$ (0.34 g, 0.82 mmol) in 20 mL of dry THF was added by cannula. The brown reaction mixture was allowed to warm to room temperature and stirred overnight. Upon removal of solvent at reduced pressure, the desire brown product was isolated.

B. Synthesis of Metal-Ethynyl Complexes

Example 3

Synthesis of 1:1 hexacarbonyldicobalt complex of 1,2,4,5-tetrakis(phenylethynyl)benzene—$Co_2(CO)_8$ (100 mg, 0.292 mmol) and 20 mL of dry hexane were added to a 100 mL round bottomed flask. While stirring, the mixture was cooled to −78° C., evacuated, and purged with argon three times to remove air. 1,2,4,5-Tetrakis(phenylethynyl)benzene (140 mg, 0.292 mmol) dissolved in 15 mL of methylene chloride was added by syringe and the resulting brown mixture was again evacuated and purged with argon three times. The mixture was allowed to warm to room temperature, resulting in a color change to dark green, and stirred 3 hr. The formation of the green solution is apparently due to the reaction of the $Co_2(CO)_8$ with an alkyne group of 1,2,4,5-tetrakis(phenylethynyl)benzene.

Example 4

Synthesis of 1:3 hexacarbonyldicobalt complex of 1,2,4,5-tetrakis)phenylethynyl)benzene—$Co_2(CO)_8$ (0.5 g, 1.46 mmol) and 75 mL of dry hexane were added to a 100 mL round bottomed flask. While stirring, the mixture was cooled to −78° C., evacuated, and purged with argon three times to remove air. 1,2,4,5-Tetrakis(phenylethynyl)benzene (2.1 g, 4.38 mmol) dissolved in 100 mL of methylene chloride was added by syringe resulting in the formation of a white precipitate. The yellowish-brown mixture was allowed to warm to room temperature and was stirred for 3 hr resulting in dissolution of the solid and a color change to dark green. The formation of the green solution is apparently due to the reaction of the $Co_2(CO)_8$ with an alkyne group of 1,2,4,5-tetrakis(phenylethynyl)benzene. The solvent was removed at reduced pressure. The product was used as prepared for characterization studies.

Example 5

Synthesis of 1:10 hexacarbonyldicobalt complex of 1,2,4,5-tetrakis(phenylethynyl)benzene—$Co_2(CO)_8$ (0.2 g, 0.58 mmol) and 75 mL of dry hexane were added to a 100 mL round bottomed flask. While stirring, the mixture was cooled to −78° C., evacuated, and purged with argon three times to remove air. 1,2,4,5-Tetrakis(phenylethynyl)benzene (2.8 g, 5.8 mmol) dissolved in 100 mL of methylene chloride was added by syringe resulting in the formation a white precipitate. The mixture was allowed to warm to room temperature and was stirred for 3 hr resulting in dissolution of the solid and a color change to dark green. The formation of the green solution is apparently due to the reaction of the $CO_2(CO)_8$ with an alkyne group of 1,2,4,5-tetrakis(phenylethynyl)benzene. The solvent was removed at reduced pressure. The produce was used as prepared for characterization studies.

Example 6

Synthesis of 1:15 hexacarbonyldicobalt complex of 1,2,4,5-tetrakis(phenylethynyl)benzene—$Co_2(CO)_8$ (0.1 g, 0.29 mmol) and 75 mL of dry hexane were added to a 100 mL round bottomed flask. While stirring, the mixture was cooled to −78° C., evacuated, and purged with argon three times to remove air. 1,2,4,5-Tetrakis(phenylethynyl)benzene (2.1 g, 4.4. mmol) dissolved in 100 mL of methylene chloride was added by syringe resulting in the formation a white precipitate. The mixture turned yellow, was allowed to warm to room temperature, and was stirred for 3 hr resulting in dissolution of the solid and a color change to dark green. The formation of the green solution is apparently due to the reaction of the $Co_2(CO)_8$ with an alkyne group of 1,2,4,5-tetrakis(phenylethynyl)benzene. The solvent was removed at reduced pressure. The product was used as prepared for characterization studies.

Example 7

Synthesis of 1:20 hexacarbonyldicobalt complex of 1,2,4,5-tetrakis(phenylethynyl)benzene—$Co_2(CO)_8$ (0.1 g, 0.29 mmol) and 75 mL of dry hexane were added to a 100 mL round bottomed flask. While stirring, the mixture was cooled to −78° C., evacuated, and purged with argon three times to remove air. 1,2,4,5-Tetrakis(phenylethynyl)benzene (2.8 g, 5.8 mmol) dissolved in 100 mL of methylene chloride was added by syringe resulting in the formation a white precipitate. The mixture turned yellow, was allowed to warm to room temperature, and was stirred for 3 hr resulting in dissolution of the solid and a color change to dark green. The formation of the green solution is apparently due to the reaction of the $Co_2(CO)_8$ with a alkyne group of 1,2,4,5-tetrakis(phenylethynyl)benzene. The solvent was removed at reduced pressure. The product was used as prepared for characterization studies.

Example 8

Synthesis of 1:50 hexacarbonyldicobalt complex of 1,2,4,5-tetrakis(phenylethynyl)benzene—$Co_2(CO)_8$ (0.1 g, 0.29 mmol) and 75 mL of dry hexane were added to a 100 mL round bottomed flask. While stirring, the mixture was cooled to −78° C., evacuated, and purged with argon three times to remove air. 1,2,4,5-Tetrakis(phenylethynyl)benzene (7.0 g, 14.6 mmol) dissolved in 175 mL, of methylene chloride was added by syringe resulting in the formation a white precipitate. The mixture turned dark brown, was allowed to warm to room temperature, and was stirred for 3 hr resulting in dissolution of the solid and a color change to dark green. The formation of the green solution is apparently due to the reaction of the $Co_2(CO)_8$ with an alkyne group of 1,2,4,5-tetrakis(phenylethynyl)benzene. The solvent was removed at reduced pressure. The product was used as prepared for characterization studies.

Example 9

Synthesis of 1:1 hexacarbonyldiiron complex of 1,2,4,5-tetrakis(phenylethynyl)benzene—$Fe_2(CO)_9$ (0.17 g, 0.47 mmol) and 25 mL of dry hexane were added to a 100 mL round bottomed flask. While stirring, the mixture was cooled to −78° C., evacuated, and purged with argon three times to remove air. 1,2,4,5-Tetrakis(phenylethynyl)benzene (0.22 g, 0.46 mmol) dissolved in 25 mL of methylene chloride was added by syringe resulting in the formation a white precipitate. The mixture was allowed to warm to room temperature and stirred for 3 hr resulting in a color change to dark red. The formation of the red solution is apparently due to the reaction of the $Fe_2(CO)_9$ with an alkyne group of 1,2,4,5-tetrakis(phenylethynyl)benzene. The solvent was removed at reduced pressure. The product was used as prepared for characterization studies.

Example 10

Synthesis of 1:5 hexacarbonyldiiron complex of 1,2,4,5-tetrakis(phenylethynyl)benzene—$Fe_2(CO)_9$ (0.202 g, 0.55 mmol) and 25 mL of dry hexane were added to a 100 mL round bottomed flask. While stirring, the mixture was cooled to −78° C., evacuated, and purged with argon three times to remove air. 1,2,4,5-Tetrakis(phenylethynyl)benzene (1.31 g, 2.74 mmol) dissolved in 25 mL of methylene chloride was added by syringe resulting in the formation a white precipitate. The mixture was allowed to warm to room temperature and stirred for 3 hr resulting in a color change to dark red. The formation of the red solution is apparently due to the reaction of the $Fe_2(CO)_9$ with a alkyne group of 1,2,4,5-tetrakis(phenylethynyl)benzene. The solvent was removed at reduced pressure. The product was used as prepared for characterization studies.

Example 11

Synthesis of 1:10 hexacarbonyldiiron complex of 1,2,4,5-tetrakis(phenylethynyl)benzene—$Fe_3(CO)_{12}$ (0.11 g, 0.20 mmol) and 60 mL of dry hexane were added to a 100 mL round bottomed flask. While stirring, the mixture was cooled to −78° C., evacuated, and purged with argon three times to remove air. 1,2,4,5-Tetrakis(phenylethynyl)benzene (0.98 g. 1.99 mmol) dissolved in 70 mL of methylene chloride was added by syringe resulting in the formation a white precipitate. The mixture was allowed to warm to room temperature and stirred for 3 hr resulting in a color change to dark red. The formation of the red solution is apparently due to the reaction of the $Fe_3(CO)_{12}$ with an alkyne group of 1,2,4,5-tetrakis (phenylethynyl)benzene. The solvent was removed at reduced pressure. The product was used as prepared for characterization studies.

Example 12

Synthesis of 1:15 hexacarbonyldiiron complex of 1,2,4,5-tetrakis(phenylethynyl)benzene—$Fe_2(CO)_9$ (0.11 g, 0.27 mmol) and 50 mL of dry hexane were added to a 100 mL round bottomed flask. While stirring, the mixture was cooled to −78° C., evacuated, and purged with argon three times to remove air. 1,2,4,5-Tetrakis(phenylethynyl)benzene (1.97 g, 4.12 mmol) dissolved in 90 mL of methylene chloride was added by syringe resulting in a yellow solution and the formation a white precipitate. The mixture was allowed to warm to room temperature and stirred for 2.5 hr resulting in dissolution of the solid and the formation of an orange homogeneous solution. The formation of the orange solution is apparently due to the reaction of the $Fe_2(CO)_9$ with an alkyne group of 1,2,4,5-tetrakis(phenylethynyl)benzene. The solvent was removed at reduced pressure. The pale red solid product was used as prepared for characterization studies.

Example 13

Synthesis of 1:10 nonacarbonyltriruthenium complex of 1,2,4,5-tetrakis(phenylethynyl)benzene—$Ru_3(CO)_{12}$ (0.14 g, 0.22 mmol) and tetrakis(phenylethynyl)benzene (1.04 g, 2.18 mmol), and 100 mL of ethanol were added to a 250 mL round bottomed flask. While stirring, the mixture was heated to reflux for 10 hr resulting in the formation of a brown solution. The solvent was removed at reduced pressure. The produce as obtained was used as prepared for characterization studies.

Example 14

Synthesis of 1:1 hexacarbonyldicobalt complex of 1,4-bis(ferrocenyl)butadiyne—$Co_2(CO)_8$ (0.17 g, 0.50 mmol) and 30 mL of dry hexane were added to a 100 mL round bottomed flask. While stirring, the mixture was cooled to −78° C., evacuated, and purged with argon three times to remove air. 1,4-Bis(ferrocenyl)butadiyne (0.21 g, 0.50 mmol) dissolved in 30 mL of methylene chloride was added by syringe. The mixture turned orange, was allowed to warm to room temperature, and was stirred for 3 hr resulting in a color change to dark brown. The solvent was removed at reduced pressure. The black product was used as prepared for characterization studies.

Example 15

Synthesis of 1:1 hexacarbonyldicobalt complex of 1-(ferrocenylethynyl)-4-(phenylethynyl)benzene—$Co_2(CO)_8$ (0.053 g, 0.16 mmol) and 25 mL of dry hexane were added to a 100 mL round bottomed flask. While stirring, the mixture was cooled to −78° C., evacuated, and purged with argon three times to remove air. 1-(Ferrocenylethynyl)-4-(phenylethynyl)benzene (0.062 g, 0.16 mmol) dissolved in 25 mL of methylene chloride was added by syringe. The mixture turned orange, was allowed to warm to room temperature, and was stirred for 4.5 hr. The formation of the orange solution is apparently due to the reaction of the $Co_2(CO)_8$ with an ethynyl group of 1-(ferrocenylethynyl)-4-(phenylethynyl) benzene. The solvent was removed at reduced pressure. The black product was used as prepared for characterization studies.

FORMATION OF POLYMER COMPOSITION

Formation of Polymer Composition from a Metal-Ethynyl Complex

Example 16

Formation of polymeric fibers from 1:15 hexacarbonyldicobalt complex of 1,2,4,5-tetrakis(phenylethynyl)benzene—The 1:15 hexacarbonyldicobalt complex of 1,2,4,5-tetrakis(phenylethynyl)benzene (0.3 g) prepared as in Example 6 was weighed into an aluminum planchet and heated at 275° C. resulting in an increase in viscosity. Before gelation or solidification occurred, a glass rod was pushed into the thick composition and removed resulting in the formation of a fibrous glassy material. These results indicate that fibers could be formed from the viscous material, thermally cured to a shaped fiber, and further heat treated at elevated temperature resulting in the formation of fibrous materials with magnetic properties.

Example 17

Formation of polymeric fibers from 1:20 hexacarbonyldicobalt complex of 1,2,4,5-tetrakis(phenylethynyl)benzene—A sample of 1:20 hexacarbonyldicobalt complex of 1,2,4,5-tetrakis(phenylethynyl)benzene (0.5 g) prepared as in Example 7 was weighted into an aluminum planchet and heated at 275° C. resulting in an increase in viscosity. Before gelation or solidification occurred, a glass rod was pushed into the thick composition and removed resulting in the formation of a fibrous glassy material. These results indicate that fibers could be formed from the viscous material, thermally cured to a shaped fiber, and further heat-treated at elevated temperatures resulting in the formation of fibrous materials with magnetic properties.

Example 18

Formation of polymeric fibers from 1;15 hexacarbonyldiiron complex of 1,2,4,5-tetrakis(phenylethynyl)benzene— The 1:15 hexacarbonyldiiron complex of 1,2,4,5-tetrakis (phenylethynyl)benzene (0.1 g) prepared as in Example 6 was weighted into an aluminum planchet and heated at 275° C. resulting in an increase in viscosity. Before gelation or solidification occurred, a glass rod was pushed into the thick composition and removed resulting in the formation of a fibrous glassy material. Further heat-treatment resulted in gelation to a solid fiber. These results indicate that fibers could be formed from the viscous material, thermally cured to a shaped fiber, and further heat-treated at elevated temperatures resulting in the formation of fibrous polymeric materials.

B. Formation of Polymer Composition from a Metal-Ethynyl Complex and an Ethynyl Compound

Example 19

Formation of polymeric fibers from 50/50 weight mixture of 1:50 hexacarbonyldicobalt complex of 1,2,4,5-tetrakis (phenylethynyl)benzene and 1,2,4,5-tetrakis(phenylethynyl) benzene—A 50/50 weight mixture (0.3 g) of 1:50 hexacarbonyldicobalt complex of 1,2,4,5-tetrakis(phenylethynyl) benzene prepared in Example 8 and 1,2,4,5-tetrakis (phenylethynyl)benzene was weighed into an aluminum planchet and heated at 275° C. resulting in an increase in viscosity. Before gelatin or solidification occurred, a glass rod was pushed into the thick composition and removed resulting in the formation of a fibrous glassy material. These results indicate that fibers could be formed from the viscous material, thermally cured to a shaped fiber, and further heat-treated at elevated temperatures resulting in the formation of fibrous materials with magnetic properties.

III. FORMATION OF METAL CARBIDE NANOPARTICLES

Example 20

Synthesis and conversion of 1/10 molar mixing of $Ni(PPh_3)_2(CO)_2$ and 1,2,4,5-tetrakis(phenylethynyl)benzene mixed in methylene chloride before heating to 1000° C. and formation of carbon nanotube-nickel nanoparticle composition—$Ni(PPh_3)_2(CO)_2$ (0.17 g, 0.26 mmol) and 1,2,4,5-tetrakis(phenylethynyl)benzene (1.26 g, 2.6 mmol) were mixed in 40 mL of methylene chloride at room temperature. The solvent was removed at reduced pressure. A sample (27.70 mg) of mixture was heated at 10° C./min to 1000° C. resulting in a weight retention of 76%. Raman (characteristic pattern) and x-ray studies confirmed the presence of carbon nanoparticles-carbon nanotubes-nickel carbide nanoparticles in the resulting composition. The structure is in the cubic phase having a lattice parameter a=0.3474 nm and an average particle size of 20.7 nm.

IV. FORMATION OF METAL NANOPARTICLE COMPOSITIONS

A. Formation of Cobalt Nanoparticle Compositions

Example 21

Polymerization and conversion of 1:1 hexacarbonyldicobalt complex of 1,2,4,5-tetrakis(phenylethynyl)benzene to carbon nanoparticle-cobalt nanoparticle composition—1:1 Hexacarbonyldicobalt complex of 1,2,4,5-tetrakis(phenylethynyl)benzene (9.50 mg) prepared as in Example 3 was heated at 10° C./min to 600° C. The sample was heated at 600° C. for 4 hr. After the heat-treatment at 600° C., the sample showed a weight retention of 58%. During the heat-treatment, polymerization through the alkyne groups to a shaped composition occurred during the early part of the heating process. Moreover, decomposition (200-500° C.) of the cobalt complex was also occurring during the heat-treatment resulting in the formation of cobalt nanoparticle polymer composition. Above 500° C., the composition was converted into a very small carbon nanoparticle-cobalt nanoparticle carbon composition.

Example 22

Pyrolysis of 1:1 hexacarbonyldicobalt complex of 1,2,4, 5-tetrakis(phenylethynyl)benzene and conversion to carbon nanotubes-cobalt nanoparticle composition—1:1 Hexacarbonyldicobalt complex of 1,2,4,5-tetrakis(phenylethynyl) benzene (10.0 mg, 13.1 mmol) prepared as in Example 3 was thoroughly mixed and heated at 10° C./min to 1000° C. in a nitrogen atmosphere in a platinum TGA cup using a TGA/DTA analyzer. The sample exhibited an endotherm at 197° C. (m.p.), an exotherm at about 190° C. attributed to the reaction of the ethynyl groups to a thermoset, and another exotherm at ≈843° C. Raman and x-ray studies confirmed the presence of carbon nanotubes in the carbon nanotube-cobalt nanoparticle carbon composition. The x-ray diffraction study showed the four characteristic reflection values for carbon nanotubes and the pattern for fcc cobalt nanoparticles. The x-ray (111) reflection for carbon nanotubes was readily apparent. The sample showed magnetic properties as determined by its strong attraction to a bar magnet.

Example 23

Conversion of 1:3 hexacarbonyldicobalt complex of 1,2, 4,5-tetrakis(phenylethynyl)benzene heated to 1000° C. to carbon nanotube-cobalt nanoparticle composition—A sample (21.14 mg) of 1:3 hexacarbonyldicobalt complex of 1,2,4,5-tetrakis(phenylethynyl)benzene prepared as in Example 4 was heated at 10° C./min to 1000° C. resulting in a char yield of 78%. Raman and x-ray studies confirmed the presence of carbon nanotubes in the carbon nanotube-cobalt nanoparticle carbon composition. The x-ray diffraction study showed the four characteristic reflection values for carbon nanotubes and the pattern for fcc cobalt nanoparticles. The x-ray (111) reflection for carbon nanotubes was readily apparent. The sample showed magnetic properties as determined by its strong attraction to a bar magnet.

Example 24

Pyrolysis of 1:10 hexacarbonyldicobalt complex of 1,2,4,5-tetrakis(phenylethynyl)benzene heated at 700° C. for 4 hr—A sample (18.43 mg) of 1:10 hexacarbonyldicobalt complex of 1,2,4,5-tetrakis(phenylethynyl)benzene prepared as in Example 5 was heated at 30° C./min to 250° C. (30 min), ramped at 10° C./min to 700° C., and held for 4 hr under an inert atmosphere resulting in a weight retention of 42%. Raman and x-ray studies confirmed a very small carbon nanoparticle-carbon nanotube-cobalt nanoparticle carbon composition. X-ray analysis showed cobalt nanoparticles in the fcc phase. The sample showed magnetic properties as determined by its strong attraction to a bar magnet.

Example 25

Conversion of 1:10 hexacarbonyldicobalt complex of 1,2,4,5-tetrakis(phenylethynyl)benzene heated to 1000° C. to carbon nanotube-cobalt nanoparticle composition—A sample (18.43 mg) of 1:10 hexacarbonyldicobalt complex of 1,2,4,5-tetrakis(phenylethynyl)benzene prepared as in Example 5 was heated at 10° C./min to 1000° C. resulting in a char yield of 77%. Raman and x-ray studies confirmed the presence of carbon nanotubes in the carbon nanotube-cobalt nanoparticle carbon composition. Raman and x-ray studies confirmed the presence of carbon nanotubes in the carbon nanotube-cobalt nanoparticle carbon composition. The x-ray diffraction study showed the four characteristic reflection values for carbon nanotubes and the patter for fcc cobalt nanoparticles. The x-ray (111) reflection for carbon nanotubes was readily apparent. The sample showed magnetic properties as determined by its strong attraction to a bar magnet.

Example 26

Pyrolysis of 1:15 hexacarbonyldicobalt complex of 1,2,4,5-tetrakis(phenylethynyl)benzene heated at 700° C. for 4 hr—A sample (23.04 mg) of 1:15 hexacarbonyldicobalt complex of 1,2,4,5-tetrakis(phenylethynyl)benzene prepared as in Example 6 was heated at 30° C./min to 250° C. (30 min.), ramped at 10° C./min to 700° C., and held for 4 hr under an inert atmosphere resulting in a weight retention of 64%. X-ray diffraction study showed the formation of very small carbon nanoparticles-carbon nanotubes-cobalt nanoparticles in the carbon composition and cobalt nanoparticles in the fcc phase.

Example 27

Conversion of 1:15 hexacarbonyldicobalt complex of 1,2,4,5-tetrakis(phenylethynyl)benzene heated at 900° C. for 4 hr to carbon nanotube-cobalt nanoparticle composition—A sample (25.49 mg) of 1:15 hexacarbonyldicobalt complex of 1,2,4,5-tetrakis(phenylethynyl)benzene prepared as in Example 6 was heated at 30° C./min to 250° C. (30 min), ramped at 10° C./min to 900° C., and held for 4 hr under an inert atmosphere resulting in a weight retention of 44%. Raman and x-ray studies confirmed the presence of carbon nanotubes in the carbon nanotube-cobalt nanoparticle carbon composition. The x-ray (111), (220), (222), and (422) reflections for carbon nanotubes were readily apparent, whereas the presence of cobalt nanoparticles in the fcc phase was weakly observed.

Example 28

Conversion of 1:15 hexacarbonyldicobalt complex of 1,2,4,5-tetrakis(phenylethynyl)benzene heated to 1000° C.—A sample (22.51 mg) of 1:15 hexacarbonyldicobalt complex of 1,2,4,5-tetrakis(phenylethynyl)benzene prepared as in Example 6 was heated at 10° C./min to 1000° C. under an inert atmosphere resulting in a weight retention of 87%. Raman and x-ray studies confirmed the presence of carbon nanotubes in the carbon nanotube-cobalt nanoparticle carbon composition. The x-ray (111),(220),(222), and (422) reflections for carbon nanotubes were readily apparent, whereas the presence of cobalt nanoparticles in the fcc phase was weak. Moreover, it appeared that the cobalt was somehow reacting with the carbon domain since evidence of free cobalt in the fcc phase was weakly observed.

Example 29

Semiconductive behavior of sample prepared from pyrolysis of 1:15 hexacarbonyldicobalt complex of 1,2,4,5-tetrakis(phenylethynyl)-benzene heated at 1000° C.—A sample (22.51 mg) of 1:15 cobalt complex prepared as in Example 6 was heated at 10° C./min to 1000° C. under an inert atmosphere resulting in a weight retention of 87%. The charred sample showed magnetic properties as determined by its attraction to a bar magnet. Moreover, it appeared that the cobalt was somehow reacting with the carbon-carbon nanotube domain since evidence of free cobalt in the fcc phase was weakly observed. Preliminary electrical resistivity measurement from −100 to 25° C. of a cobalt sample heated to 1000° C. showed magnetc semiconductor behavior from −100 to 0° C. (6.0-5.3×10·2 ohn·cm) and semimetallic behavior above 0° C.

Example 30

Formation of carbon nanotube-cobalt nanoparticle fibers from 1:15 hexacarbonyldicobalt complex of 1,2,4,5-tetrakis (phenylethynyl)benzene heated to 1000° C.—The 1:15 hexacarbonyldicobalt complex of 1,2,4,5-tetrakis(phenylethynyl)benzene (0.2 g) prepared as in Example 6 was weighted into a test tube, wrapped with heating tape, and melted by heating at 275-300° C., resulting in an increase in viscosity. Before gelation or solidification occurred, a glass rod was pushed into the thick composition and removed, resulting in the formation of a fibrous glassy material. While continuing to heat, the fibrous material solidified. At this time, the fibrous material was removed, placed on a graphitic plate in a tube furnace, and heated at 1° C./min to 1000° C. and held for 1 hr. The fibrous sample was cooled at 0.5° C./min to room temperature. Raman and x-ray studies showed the formation of carbon nanotubes and cobalt nanoparticles. These results indicate that carbon nanotube-cobalt nanoparticle-containing fibers can be formed from precursor material containing a trace amount of cobalt by thermally curing to a shaped fiber, and further heat-treatment at elevated temperatures.

Example 31

Pyrolysis of 1:15 hexacarbonyldicobalt complex of 1,2,4,5-tetrakis(phenylethynyl)benzene heated to 1000° C. on silica wafer and formation of carbon nanotubes-cobalt nanoparticles and thin film containing carbon nanotubes-cobalt nanoparticles on the surface of silica—A sample (9.0 mg) of 1:15 hexacarbonyldicobalt complex of 1,2,4,5-tetrakis(phenylethynyl)benzene prepared as in Example 6 was placed on a silica wafer. The silica wafer/sample was placed in a furnace and quickly heated under an argon atmosphere to 225° C. and held for 15 minutes. At this time, the wafer/sample was slowly heated at 0.5° C./min to 1000° C. and then cooled at 0.4° C./min to 125° C. and then to room temperature overnight. Upon removal from the furnace, the sample easily debonded from the silica surface. HRSEM studies on the silica surface where the sample was heat-treated showed a thin film or presence of carbon nanotubes. Thus, the Co nanoparticles contributed to the formation of carbon nanotubes on the surface of the silica wafer and were embedded in the carbon-carbon nanotube composition. X-ray diffraction study showed the pattern reported for carbon nanotubes and cobalt nanoparticles in the fcc phase in the bulk sample that detached from the silica wafer.

Example 32

Pyrolysis of 1:20 hexacarbonyldicobalt complex of 1,2,4,5-tetrakis(phenylethynyl)benzene heated to 600° C.—A sample (22.34 mg) of 1:20 hexacarbonyldicobalt complex of 1,2,4,5-tetrakis(phenylethynyl)benzene prepared as in Example 7 was heated at 10° C./min to 600° C. under an inert atmosphere resulting in a weight retention of 91%. X-ray diffraction study showed the formation of mainly very small carbon nanoparticles and fcc cobalt nanoparticles.

Example 33

Pyrolysis of 1:20 hexacarbonyldicobalt complex of 1,2,4,5-tetrakis(phenylethynyl)benzene heated to and at 600° C. for 4 hr—A sample (19.10 mg) of 1:20 hexacarbonyldicobalt complex of 1,2,4,5-tetrakis(phenylethynyl)benzene prepared as in Example 7 was heated at 10° C./min to 600° C. and held for 4 hr under an inert atmosphere resulting in a weight retention of 65%. Raman and x-ray studies confirmed the presence of small very small carbon nanoparticles and carbon nanotubes in the carbon nanoparticle-carbon nanotube-cobalt nanoparticle carbon composition. The x-ray (111) reflection was very broad indicating a carbon nanotube-carbon nanoparticle composition along with fcc cobalt nanoparticles.

Example 34

Pyrolysis of 1:20 hexacarbonyldicobalt complex of 1,2,4,5-tetrakis(phenylethynyl)benzene heated at 700° C.—A sample (22.34 mg) of 1:20 hexacarbonyldicobalt complex of 1,2,4,5-tetrakis(phenylethynyl)benzene prepared as in Example 7 was heated at 10° C./min to 700° C. and held for 4 hr under an inert atmosphere resulting in a weight retention of 67%. Raman and x-ray studies confirmed the presence of very small carbon nanoparticles-carbon nanotubes-cobalt nanoparticles in the carbon composition. The x-ray (111) reflection was very broad indicating a carbon nanotube-carbon nanoparticle composition along with fcc cobalt nanoparticles.

Example 35

Conversion of 1:20 hexacarbonyldicobalt complex of 1,2,4,5-tetrakis(phenylethynyl)benzene heated at 800° C. for 4 hr to carbon nanotube-cobalt nanoparticle composition—A sample (24.13 mg) of 1:20 hexacarbonyldicobalt complex of 1,2,4,5-tetrakis(phenylethynyl)benzene prepared as in Example 7 was heated at 10° C./min to 800° C. and held for 4 hr under an inert atmosphere resulting in a weight retention of 63%. Raman and x-ray studies confirmed the presence of carbon nanotubes in the carbon nanotube-cobalt nanoparticle carbon composition. The x-ray (111), (220), (222), and (422) reflections for carbon nanotubes were readily apparent, whereas the presence of cobalt nanoparticles in the fcc phase was weak.

Example 36

Conversion of 1:20 hexacarbonyldicobalt complex of 1,2,4,5-tetrakis(phenylethynyl)benzene heated at 900° C. for 4 hr to carbon nanotube-cobalt nanoparticle composition—A sample (24.73 mg) of 1:20 hexacarbonyldicobalt complex of 1,2,4,5-tetrakis(phenylethynyl)benzene prepared as in Example 7 was heated at 10° C./min to 900° C. and held for 4 hr under an inert atmosphere resulting in a weight retention of 60%. Raman and x-ray studies confirmed the presence of carbon nanotubes in the carbon nanotube-cobalt nanoparticle carbon composition. The x-ray (111), (220), (222), and (422) reflections for carbon nanotubes were readily apparent, whereas the presence of cobalt nanoparticles in the fcc phase was weak. Moreover, it appeared that the cobalt was somehow reacting with the developing carbon-carbon nanotube domain since evidence of free cobalt in the fcc phase was weakly observed.

Example 37

Conversion of 1;20 hexacarbonyldicobalt complex of 1,2,4,5-tetrakis(phenylethynyl)benzene heated to 1000° C. to carbon nanotube-cobalt nanoparticle composition—A sample (17.71 mg) of 1:20 hexacarbonyldicobalt complex of 1,2,4,5-tetrakis(phenylethynyl)benzene prepared as in Example 7 was heated at 10° C./min to 1000° C. under an inert atmosphere resulting in a weight retention of 86%. Raman and x-ray studies confirmed the presence of carbon nanotubes in the carbon nanotube-cobalt nanoparticle carbon composition. The x-ray (111), (220), (222), and (422) reflections for carbon nanotubes were readily apparent, whereas the presence of cobalt nanoparticles in the fcc phase was weak. Moreover, it appeared that the cobalt was somehow reacting with the carbon domain since evidence of free cobalt in the fcc phase was weakly observed.

Example 38

Formation of carbon nanotube-cobalt nanoparticle-containing fibers from 1:20 hexacarbonyldicobalt complex of 1,2,4,5-tetrakis(phenylethynyl)benzene—A sample of 1:20 hexacarbonyldicobalt complex of 1,2,4,5-tetrakis(phenylethynyl)benzene (0.1 g) prepared as in Example 7 was weighed into a test tube, wrapped with heating tape, and melted by heating at 275-300° C. resulting in an increase in viscosity. Before gelation or solidification occurred, a glass rod was pushed into the thick composition and removed resulting in the formation of a fibrous glassy material. While continuing to heat, the fibrous material solidified. At this time, the fibrous material was removed, placed on a graphitic plate in a tube furnace, and heated at 1° C./min to 1000° C. The fibrous sample was cooled at 0.5° C./min to room temperature. Raman and x-ray studies showed the formation of carbon nanotubes and cobalt nanoparticles in the fcc phase. These results indicate that carbon nanotube-cobalt nanoparticle-containing fibers can be formed from precursor material containing cobalt by thermally curing to a shaped fiber, and further heat-treatment at elevated temperatures resulting in the formation of carbon nanotube-containing fibers with magnetic properties.

Example 39

Pyrolysis of 1:20 hexacarbonyldicobalt complex of 1,2,4,5-tetrakis(phenylethynyl)benzene 1000° C. on silica wafer and formation of carbon nanotubes-cobalt nanoparticles and thin film containing carbon nanotubes on surface of silica—A sample (9.2 mg) of 1:20 hexacarbonyldicobalt complex of 1,2,4,5-tetrakis(phenylethynyl)benzene prepared as in Example 7 was placed on a silica wafer. The silica wafer/sample was placed in a furnace and quickly heated under an argon atmosphere to 225° C. and held for 15 minutes. At this time, the wafer/sample was slowly heated at 0.5° C./min to 1000° C. and then cooled at 0.4° C./min to 125° C. and then to room temperature over night. Upon removal from the furnace, the sample easily debonded from the silica surface. HRSEM studies on the silica surface where the sample was heat-treated showed the presence of carbon nanotubes. Thus, the Co nanoparticles contributed to the formation of carbon nanotubes on the surface of the silica wafer and were embedded in the carbon-carbon nanotube composition. X-ray diffraction study showed the characteristic reflection pattern reported for carbon nanotubes and cobalt nanoparticles in the fcc phase in the bulk sample that Example 40

Conversion of 1:20 hexacarbonyldicobalt complex of 1,2,4,5-tetrakis(phenylethynyl)benzene heated to 1400° C. to carbon nanotube-cobalt nanoparticle composition—A sample (17.53 mg) of 1:20 hexacarbonyldicobalt complex of 1,2,4,5-tetrakis(phenylethynyl)benzene prepared as in Example 7 was heated at 10° C./min to 1000° C. under an inert atmosphere resulting in a weight retention of 87%. Raman and x-ray studies confirmed the presence of carbon nanotubes in the carbon nanotube-cobalt nanoparticle carbon composition. The x-ray (111), (220), (222), and (422) reflections for carbon nanotubes were readily apparent, whereas the presence of cobalt nanoparticles in the fcc phase was weak. Moreover, it appeared that the cobalt was somehow reacting with the carbon domain since evidence of free cobalt in the fcc phase was weakly observed.

Example 41

Conversion of 1:20 hexacarbonyldicobalt complex of 1,2,4,5-tetrakis(phenylethynyl)benzene heated to 1570° C. to carbon nanotubes-cobalt nanoparticle composition—A sample (15.48 mg) of 1:20 hexacarbonyldicobalt complex of 1,2,4,5-tetrakis(phenylethynyl)benzene prepared as in Example 7 was heated at 10° C./min to 1570° C. and held for 1 hr under an inert atmosphere resulting in a weight retention of 84%. Raman and x-ray studies showed strong evidence of carbon nanotubes in the carbon nanotube-cobalt nanoparticle carbon composition. The x-ray (111), (220), (222), and (422) reflections for carbon nanotubes were readily apparent, whereas the presence of cobalt nanoparticles in the fcc phase was weak. Moreover, it appeared that the cobalt was somehow reacting with the developing carbon-carbon nanotube domain since evidence of free cobalt in the fcc phase was weakly observed.

Example 42

Pyrolysis of 1:50 hexacarbonyldicobalt complex of 1,2,4,5-tetrakis(phenylethynyl)benzene heated to 600° C.—A sample (17.68 mg) of 1:50 hexacarbonyldicobalt complex of 1,2,4,5-tetrakis(phenylethynyl)benzene prepared as in Example 8 was heated at 10° C./min. to 600° C. under an inert atmosphere resulting in a weight retention of 92%. X-ray diffraction study showed the formation of mainly very small carbon nanoparticles at a reflection value of about 23.50. X-ray diffraction also showed a small quantity of cobalt nanoparticles in the fcc phase.

Example 43

Pyrolysis of 1:50 hexacarbonyldicobalt complex of 1,2,4,5-tetrakis(phenylethynyl)benzene heated at 600° C. for 6 hr—A sample (18.31 mg ) of 1:50 hexacarbonyldicobalt complex 1,2,4,5-tetrakis(phenylethynyl)benzene prepared as in Example 8 was heated at 10° C./min to 600° C. and held for 6 hr under an inert atmosphere resulting in a weight retention of 75%. X-ray diffraction study showed the formation of mainly very small carbon nanoparticles and a small quantity of cobalt nanoparticles in the fcc phase.

Example 44

Conversion of 1:50 hexacarbonyldicobalt complex of 1,2,4,5-tetrakis(phenylethynyl)benzene heated to 1000° C. to carbon nanotubes—A sample (13.65 mg) of 1:50 hexacarbonyldicobalt complex of 1,2,4,5-tetrakis(phenylethynyl)benzene prepared as in Example 8 was heated at 10° C./min to 1000° C. under an inert atmosphere resulting in a weight retention of 80%. Raman and x-ray studies confirmed the presence of carbon nanotubes in the carbon nanotube-cobalt nanoparticle carbon composition. The x-ray (111), (220), (222), and (422) reflections for carbon nanotubes were readily apparent, whereas the presence of cobalt nanoparticles in the fcc phase was extremely weak.

Example 45

Thermal conversion of 50/50 molar mixture of 1:1 hexacarbonyldicobalt complex of 1,2,4,5-tetrakis(phenylethynyl)benzene and 1,2,4,5-tetrakis(phenylethynyl)benzene to carbon nanotube-cobalt nanoparticle composition—1:1 Hexacarbonyldicobalt complex of 1,2,4,5-tetrakis(phenylethynyl)benzene (10.0 mg, 0.0131 mmol) prepared as in Example 3 and 1,2,4,5-tetrakis(phenylethynyl)benzene (6.3 mg, 0.0132 mmol) were thoroughly mixed and heated in a TGA chamber at 10° C./min to 1000° C. Polymerization to a shaped composition occurred during the initial heat-treatment up to 500° C. During the heat-treatment, the sample showed an endotherm at 197° C. (m.p.) and an exotherm at 290° C. (polymerization reaction). After heating to 1000° C., the sample exhibited a char yield of about 70%. Raman study showed the presence of carbon nanotubes. An x-ray diffraction study confirmed the presence of carbon nanotubes-cobalt nanoparticle in the carbon composition. The Raman spectrum showed sharp characteristic D and G lines and not fully developed absorptions at 2400-3250 cm$^{-1}$, which indicates carbon nanotube formation in the early stage. The x-ray diffraction study showed the four characteristic reflection values for carbon nanotubes and the pattern for fcc cobalt nanoparticles. The x-ray (111) reflection for carbon nanotubes was readily apparent. Raman and x-ray studies confirmed the presence of carbon nanotubes-cobalt nanoparticles in the carbon composition. The x-ray (111) reflection value for carbon nanotubes was at 25.85. X-ray studies also showed cobalt nanoparticles in the fcc phase.

Example 46

Thermal conversion of 25/75 molar mixture of 1:1 hexacarbonyldicobalt complex of 1,2,4,5-tetrakis(phenylethynyl) benzene and 1,2,4,5-tetrakis(phenylethynyl)benzene to a carbon nanotube-cobalt nanoparticle composition—1:1 Hexacarbonyldicobalt complex of 1,2,4,5-tetrakis(phenylethynyl)benzene (8.0 mg, 0.0105 mmol) prepared as in Example 3 and 1,2,4,5-tetrakis(phenylethynyl)benzene (15 mg, 0.0314 mmol) were thoroughly mixed and heated in a TGA chamber at 10° C./min to 1000° C. resulting in a shaped composition and a char yield of 71%. Raman and x-ray studies confirmed the presence of carbon nanotubes-cobalt nanoparticles in the carbon composition. The x-ray diffraction study showed the four characteristic reflection values for carbon nanotubes and the pattern for fcc cobalt nanoparticles. The x-ray (111) reflection for carbon nanotubes was readily apparent. Raman and x-ray studies confirmed the presence of carbon nanotubes-cobalt nanoparticles in the carbon composition.

Example 47

Polymerization and conversion of 25/75 molar mixture of 1:1 hexacarbonyldicobalt complex of 1,2,4,5-tetrakis(phenylethynyl)benzene and 1,2,4,5-tetrakis(phenylethynyl)benzene to carbon nanotube-cobalt nanoparticle composition—1:1 Hexacarbonyldicobalt complex of 1,2,4,5-tetrakis (phenylethynyl)benzene (8.0 mg, 0.0105 mmol) prepared in Example 3 and 1,2,4,5-tetrakis(phenylethynyl)benzene (15 mg, 0.0314 mmol) were thoroughly mixed and heated in a TGA chamber at 10° C./min to 1000° C. Raman and x-ray studies confirmed and presence of carbon nanotubes in the carbon nanotube-cobalt nanoparticle carbon composition. The x-ray diffraction study showed the four characteristic reflection values for carbon nanotubes and the pattern for fcc cobalt nanoparticles. The x-ray (111) reflection for carbon nanotubes was readily apparent. Raman and x-ray studies confirmed the presence of carbon nanotubes-cobalt nanoparticles in the carbon composition. The sample showed strong magnetic properties as determined by its attraction to a bar magnet.

Example 48

Conversion of 50/50 weight mixture of 1:50 hexacarbonyldicobalt complex of 1,2,4,5-tetrakis(phenylethynyl)benzene and 1,2,4,5-tetrakis(phenylethynyl)benzene heated to 1000° C. to carbon nanotubes—The 1:50 hexacarbonyldicobalt complex of 1,2,4,5-tetrakis(phenylethynyl)benzene (25 mg) prepared as in Example 8 and 1,2,4,5-tetrakis (phenylethynyl)benzene (25 mg) were thoroughly mixed and used for pyrolysis studies. A sample (26.34 mg) of the mixture was heated at 10° C./min to 1000° C. under an inert atmosphere resulting in a weight retention of 84%. The Raman spectra showed the presence of carbon nanotubes. X-ray diffraction study showed the formation of at least 75% carbon nanotubes and about 25% carbon nanoparticles in the composition. The x-ray (111), (220), (222), and (422) reflections for carbon nanotubes were readily apparent. The lattice parameter for carbon nanotube was 5.983 Å. The average size of carbon nanotubes was 4.14 nm. X-ray diffraction analysis shows only a very weak evidence of cobalt nanoparticles in the fcc phase.

Example 49

Conversion of 50/50 weight mixture of 1:50 hexacarbonyldicobalt complex of 1,2,4,5-tetrakis(phenylethynyl)benzene and 1,2,4,5-tetrakis(phenylethynyl)benzene heated to 1000° C. for 1 hr to all carbon nanotubes—The 1:50 hexacarbonyldicobalt complex of 1,2,4,5-tetrakis(phenylethynyl)benzene (25 mg) prepared in Example 8 and 1,2,4,5-tetrakis(phenylethynyl)benzene (25 mg) were thoroughly mixed and used for pyrolysis studies. A sample (16.98 mg) of the mixture was heated at 10° C./min to 1000° C. and held for 1 hr under an inert atmosphere resulting in a weight retention of 65%. The Raman spectra showed the sharp peaks and the characteristic spectrum for carbon nanotubes. X-ray diffraction study showed the characteristic reported spectra for carbon nanotubes in the composition with a strong peak (111) centered at about 25.85 (2-Theta value). The x-ray (111), (220), (222), and (422) reflections for carbon nanotubes were readily apparent, whereas little evidence of cobalt nanoparticles was observed. The lattice parameter for carbon nanotubes was 5.9739 Å. The average size of carbon nanotubes was 4.5 nm. X-ray diffraction analysis shows only a very weak evidence of cobalt nanoparticles in the fcc phase.

Example 50

Formation of carbon nanotube-cobalt nanoparticle fibers from 50/50 weight mixture of 1:50 hexacarbonyldicobalt complex of 1,2,4,5-tetrakis(phenylethynyl)benzene and 1,2,4,5-tetrakis(phenylethynyl)benzene heated in 1000° C.—The mixture(0.2 g) prepared in Example 49 was weighted into a test tube, wrapped with heating tape, and melted by heating at 275-300° C. resulting in an increase in viscosity. Before gelation or solidification occurred, a glass rod was pushed into the thick composition and removed resulting in the formation of a fibrous glassy material. While continuing to heat, the fibrous material solidified. At this time, the fibrous material was removed, placed on a graphitic plate in a tube furnace, and heated at 1° C./min to 1000° C. and held for 1 hr. The fibrous sample was cooled at 0.5° C./min to room temperature. Raman and x-ray studies showed the formation of carbon nanotubes. These results indicate that carbon nanotube-cobalt nanoparticle-containing fibers can be formed from precursor material containing a trace amount of cobalt by thermally curing to a shaped fiber, and further heat-treated at elevated temperatures resulting in the formation of carbon nanotube-cobalt nanoparticle-containing fibers.

Example 51

Synthesis of carbon nanotubes from 1/10 molar mixture of hexacarbonyldicobalt and 1,2,4,5-tetrakis(phenylethynyl) benzene heated to 1000° C.—1,2,4,5-Tetrakis(phenylethynyl)benzene (0.756 g, 0.157 mmol) and hexacarbonyldicobalt (0.0058 g, 0.0156 mmol) were weighted into an Al planchet and heated to 225° C. at reduced pressure for 20 minutes resulting in the rapid evolution of volatiles at the beginning of the heating. Upon cooling, a sample (21.79 mg) was heated at 10° C./min to 1000° C. resulting in a weight retention of 77% weight. Raman (characteristic pattern) and x-ray studies confirmed the presence of carbon nanotubes in the carbon nanotube-ruthenium nanoparticle carbon composition. The characteristic x-ray (111),(220),(222), and (422) reflections for carbon nanotubes were readily apparent. The average size of the cobalt nanoparticles in the fcc phase was 10.0 nm.

B. Formation of Iron Nanoparticle Composition

Example 52

Pyrolysis of sample prepared from 1/100 molar mixture of bis(ferrocenyl)-butadyine/1,2,4,5-tetrakis(phenylethynyl) benzene heated to 1000° C. and formation of carbon nanotubes—Bis(ferrocenyl)butadiyne (0.91 mg, 0.0021 mmol) and 1,2,4,5-tetrakis(phenylethynyl)benzene (99 mg, 0.21 mmol) were thoroughly mixed, degassed at 225° C. (15 min), and used for pyrolysis studies. A sample (30.86 mg) of the 1/100 molar mixture was heated at 10° C./min to 1000° C. under an inert atmosphere resulting in a weight retention of 84%. Raman and x-ray studies confirmed the presence of carbon nanotubes in the carbon nanotube-iron nanoparticle carbon composition. The characteristic x-ray (111),(220), (222), and (422) reflections for carbon nanotubes were readily apparent, whereas the bcc iron nanoparticle pattern was not evident. X-ray diffraction study showed the characteristic (111) reflection value at about 25.85 (2-Theta). The lattice parameter for carbon nanotube was 5.9767 Å. The average size of carbon nanotubes was 3.82 nm.

Example 53

Pyrolysis of 1:5 hexacarbonyldiiron complex of 1,2,4,5-tetrakis(phenylethynyl)benzene and formation of carbon nanotube-iron nanoparticle composition—A sample (19.06 mg) of 1:5 hexacarbonyldiiron complex of 1,2,4,5-tetrakis (phenylethynyl)benzene prepared as in Example 10 was heated at 30° C./min to 250° C. and held for 30 min. At this time, the sample was then heated at 10° C./min to 1000° C. resulting in a weight retention of 74%. Raman and x-ray studies confirmed the presence of carbon nanotubes in the carbon nanotube-iron nanoparticle carbon composition. The x-ray (111), (220), (222), and (422) reflections for carbon nanotubes were readily apparent, along with the bcc iron nanoparticles pattern and some evidence of iron carbide ($Fe_3C$) nanoparticles. The x-ray (111) reflection for carbon nanotubes was readily apparent. The sample showed magnetic properties as determined by its attraction to a bar (permanent) magnet. The size of the nanoparticles was 4.4 nm.

Example 54

Heat-treatment of 1:5 hexacarbonyldiiron complex of 1,2,4,5-tetrakis(phenylethynyl)benzene heated to 700° C. and formation of carbon nanotube-iron nanoparticle composition—A sample (24.04 mg) of 1:5 hexacarbonyldiiron complex of 1,2,4,5-tetrakis(phenylethynyl) benzene prepared as in Example 10 was heated at 30° C./min to 250° C. and held for 30 min. At this time, the sample was then heated at 10° C./min to 700° C. and held at this temperature for 1 hr resulting in a weight retention of 68%. Raman and x-ray studies confirmed the presence of carbon nanotubes in the carbon nanotube-iron nanoparticle carbon composition. The x-ray (111), (220), (222), and (422) reflections for carbon nanotubes were readily apparent, along with the bcc iron nanoparticle pattern and a small amount of iron carbide ($Fe_3C$) nanoparticles. The x-ray (111) reflection for carbon nanotubes was readily apparent. The lattice parameter for carbon nanotubes was 5.9639 Å. The average size of carbon nanotubes was 5.1 nm. The sample showed magnetic properties as determined by its attraction to a bar (permanent) magnet. The average size of Fe bcc nanoparticles, was 12.8 nm.

Example 55

Pyrolysis of 1:5 hexacarbonyldiiron complex of 1,2,4,5-tetrakis(phenylethynyl)benzene heated to 1000° C. and formation of carbon nanotube-iron nanoparticle composition—A sample (19.06 mg) of 1:5 hexacarbonyldiiron complex of 1,2,4,5-tetrakis(phenylethynyl)benzene prepared as in Example 10 was heated at 30° C./min to 250° C. and held for 30 min. At this time, the sample was then heated at 10° C./min to 1000° C. resulting in a weight retention of 66%. Raman and x-ray studies confirmed the presence of carbon nanotubes in the carbon nanotube-iron nanoparticle carbon composition. The x-ray (111), (220), (222), and (422) reflections for carbon nanotubes were readily apparent, along with the bcc iron nanoparticle pattern and a small amount of iron carbide ($Fe_3C$) nanoparticles. The x-ray (111) reflection for carbon nanotubes was readily apparent. The lattice parameter for carbon nanotubes was 5.9484 Å. The average size of carbon nanotubes was 4.4 nm. The sample showed magnetic properties as determined by its attraction to a bar (permanent) magnet. The average size of Fe bcc nanoparticles was 7.0 nm.

Example 56

Pyrolysis of 1:10 hexacarbonyldiiron complex of 1,2,4, 5-tetrakis(phenylethynyl)benzene heated to 1000° C. and formation of carbon nanotube-iron nanoparticle composition—A sample (33.69 mg) of 1:10 hexacarbonyldiiron complex of 1,2,4,5-tetrakis(phenylethynyl)benzene prepared as in Example 11 was heated at 30° C./min to 250° C. and held for 30 min. At this time, the sample was then heated at 10° C./min to 1000° C. resulting in a weight retention of 82%. Raman and x-ray studies confirmed the presence of carbon nanotubes in the carbon nanotube-iron nanoparticle carbon composition. The characteristic x-ray (111), (220), (222), and (422) reflections for carbon nanotubes were readily apparent, whereas the bcc iron nanoparticle pattern was very weak. The lattice parameter for carbon nanotubes was 5.9624 Å. The average size of carbon nanotubes was 3.9 nm. The sample showed magnetic properties as determined by its attraction to a bar (permanent) magnet. The average size of Fe nanoparticles in bcc phase was 15.4 nm.

Example 57

Pyrolysis of 1:15 hexacarbonyldiiron complex of 1,2,4, 5-tetrakis(phenylethynyl)benzene heated to 1000° C. and formation of carbon nanotube-iron nanoparticle composition—A sample (33.69 mg) of 1:15 hexacarbonyldiiron complex of 1,2,4,5-tetrakis(phenylethynyl)benzene prepared as in Example 12 was heated at 30° C./min to 250° C. and held for 30 min. At this time, the sample was then heated at 10° C./min to 1000° C. resulting in a weight retention of 82%. Raman and x-ray studies confirmed the presence of carbon nanotubes in the carbon nanotube-iron nanoparticle carbon composition. The characteristic x-ray (111), (220), (222), and (422) reflections for carbon nanotubes were readily apparent, whereas the bcc iron nanoparticle pattern was not evident. The lattice parameter for carbon nanotubes was 5.972 Å. The average size of carbon nanotubes was 4.0 nm. The sample showed magnetic properties as determined by its attraction to a bar (permanent) magnet.

Example 58

Formation of carbon nanotube-iron nanoparticle fibers from 1:15 hexacarbonyldiiron complex of 1,2,4,5-tetrakis (phenylethynyl)benzene heated to 1000° C.—The 1:15 hexacarbonyldiiron complex of 1,2,4,5-tetrakis(phenylethynyl)benzene (0.2 g) prepared as in Example 12 was weighted into a test tube, wrapped with heating tape, and melted by heating at 275-300° C. resulting in an increase in viscosity. Before gelation or solidification occurred, a glass rod was pushed into the thick composition and removed resulting in the formation of a fibrous glassy material. While continuing to heat, the fibrous material solidified. At this time, the fibrous material was removed, placed on a graphitic plate in a tube furnace, and heated at 1° C./min to 1000° C. and held for 1 hr. The fibrous sample was cooled at 0.5° C./min to room temperature. Raman and x-ray studies showed the presence of carbon nanotubes and iron nanoparticles in the bcc phase in the fiber. These results indicate that carbon nanotube-iron nanoparticle containing fibers can be formed from the precursor material containing iron by thermally curing of a fiber, and further heat-treatment of the fiber at elevated temperatures resulting in the formation of carbon nanotube-iron nanoparticles-containing fibers with magnetic properties. The fiber showed magnetic properties as determined by its attraction to a bar magnet.

Example 59

Synthesis of carbon nanoparticles-iron nanoparticles from 1/5 molar mixture of $Fe_2(CO)_9$ and 1,2,4,5-tetrakis(phenylethynyl)benzene mixed in hexane before heating to 400° C. for 4 hr—1,2,4,5-Tetrakis(phenylethynyl)benzene (0.14 g, 0.30 mmol) and $Fe_2(CO)_9$ (0.022 g, 0.060 mmol) were weighted into an 100 mL flask. Hexane (50 mL) was added and the resulting mixture was stirred rapidly for 5 minutes. The $Fe_2(CO)_9$ dissolved in the hexane without any color change. Upon concentrating at reduced pressure, little particles of the $Fe_2(CO)_9$ were deposited homogeneously throughout the 1,2,4,5-tetrakis(phenylethynyl)benzene. A sample (40.54 mg) was heated at 10° C./min to 400° C. and held for 4 hr. X-ray diffraction analysis showed the formation of carbon nanoparticles and an unidentified Fe nanoparticle phase. The sample was magnetic as determined by the attraction to a bar magnet.

Example 60

Synthesis of carbon nanoparticles-iron nanoparticles from 1/5 molar mixture of $Fe_2(CO)_9$ and 1,2,4,5-tetrakis(phenylethynyl)benzene mixed in hexane before heating to 400° C. for 4 hr—1,2,4,5-Tetrakis(phenylethynyl)benzene (0.14 g, 0.30 mmol) and $Fe_2(CO)_9$ (0.022 g, 0.060 mmol) were weighed into an 100 mL flask. Hexane (50 mL) was added and the resulting mixture was stirred rapidly for 5 minutes. The $Fe_2(CO)_9$ dissolved in the hexane without any color change. Upon concentrating at reduced pressure, little particles of the $Fe_2(CO)_9$ were deposited homogeneously throughout the 1,2,4,5-tetrakis(phenylethynyl)benzene. A sample (41.70 mg) was heated at 10° C./min to 500° C. and held for 4 hr. X-ray diffraction analysis showed the formation of carbon nanoparticles and an unidentified Fe nanoparticle phase. The sample was magnetic as determined by the attraction to a bar magnet.

Example 61

Synthesis of carbon nanotubes-iron nanoparticles from 1:5 molar mixture of $Fe_2(CO)_9$ and 1,2,4,5-tetrakis(phenylethynyl)benzene mixed in hexane before heating to 1000° C.—1,2,4,5-Tetrakis(phenylethynyl)benzene (0.14 g, 0.30 mmol) and $Fe_2(CO)_9$ (0.022 g, 0.060 mmol) were weighed into an 100 mL flask. Hexane (50 mL) was added and the resulting mixture was stirred rapidly for 5 minutes. The $Fe_2(CO)_9$ dissolved in the hexane without any color change. Upon concentrating at reduced pressure, little particles of the $Fe_2(CO)_9$ were deposited homogeneously throughout the 1,2,4,5-tetrakis(phenylethynyl)benzene. A sample (37.51 mg) was heated at 10° C./min to 1000° C. resulting in a weight retention 72%. Raman (characteristic pattern) and x-ray studies confirmed the presence of carbon nanotubes in the carbon nanotube-iron nanoparticle carbon composition. The characteristic x-ray (111), (220), (222), and (422) reflections for carbon nanotubes were readily apparent. The x-ray pattern for Fe nanoparticles (bcc phase) was very large and evidence of a very small amount of iron carbide was present.

Example 62

Synthesis of carbon nanotubes-iron nanoparticles from 1/20 molar mixture of $Fe_2(CO)_9$ and 1,2,4,5-tetrakis(phenylethynyl)benzene heated to 1000° C.—1,2,4,5-Tetrakis (phenylethynyl)benzene (0.10 g, 0.21 mmol) and $Fe_2(CO)_9$ (0.0038 g, 0.0104 mmol) were weighed into an Al planchet and heated to 260° C. at reduced pressure for 5 minutes resulting in the rapid evolution of volatiles at the beginning of the heating. Upon cooling, a sample (28.82 mg) was heated at 10° C./min to 1000° C. resulting in a weight retention of 80% weight. Raman (characteristic pattern) and x-ray studies confirmed the presence of carbon nanotubes in the carbon nanotube-iron nanoparticle carbon composition. The characteristic x-ray (111), (220), (222), and (422) reflections for carbon nanotubes were readily apparent. The x-ray pattern for iron nanoparticles (bcc phase) was very small.

Example 63

Synthesis of carbon nanotubes-iron nanoparticles from 1/15 molar mixture of $Fe_2(CO)_9$ and 1,2,4,5-tetrakis(phenylethynyl)benzene mixed in hexane before heating to 1000° C.—1,2,4,5-Tetrakis(phenylethynyl)benzene (1.79 g, 3.74 mmol) and $Fe_2(CO)_9$ (0.091 g, 0.25 mmol) were weighed into an 100 mL flask. Hexane (50 mL) was added and the resulting mixture was stirred rapidly for 5 minutes. The $Fe_2(CO)_9$ dissolved in the hexane without any color change. Upon concentrating at reduced pressure, little particles of the $Fe_2(CO)_9$ were deposited homogeneously throughout the 1,2,4,5-tetrakis(phenylethynyl)benzene. A sample (35.50 mg) was heated at 10° C./min to 1000° C. resulting in a weight retention of 79% weight. Raman (characteristic pattern) and x-ray studies confirmed the presence of carbon nanotubes in the carbon nanotube-iron nanoparticle carbon composition. The characteristic x-ray (111), (220), (222), and (422) reflections for carbon nanotubes were readily apparent. The x-ray pattern for iron nanoparticles (bcc phase) was very small.

C. Formation of Ruthenium Nanoparticle Compositions

Example 64

Conversion of 1:10 nonacarbonyltriruthenium complex of 1,2,4,5-tetrakis(phenylethynyl)benzene at 1000° C. to ruthenium nanoparticle composition—A sample (18.08 mg) or 1:10 nonacarbonyltriruthenium complex of 1,2,4,5-tetrakis (phenylethynyl)benzene prepared as in Example 13 was heated at 10° C./min to 1000° C. resulting in a weight retention of 81%. X-ray studies confirmed the presence of ruthenium nanoparticles (1-2 nm) in the carbon composition. The structure was a hexagonal phase having lattice parameters a=0.2734 nm and c=0.4271 nm.

Example 65

Conversion of 1:10 nonacarbonyltriruthenium complex of 1,2,4,5-tetrakis(phenylethynyl)benzene to carbon nanotube-ruthenium nanoparticle composition—A sample (22.3 mg) of 1:10 nonacarbonyltriruthenium complex of 1,2,4,5-tetrakis(phenylethynyl)benzene prepared as in Example 13 was heated at 10° C./min to 1400° C. resulting in a weight retention of 79%. Raman and x-ray studies confirmed the presence of carbon nanotubes in the carbon nanotube-ruthenium nanoparticle carbon composition. The characteristic x-ray (111), (220), (222), and (422) reflections for carbon nanotubes were readily apparent. The x-ray study shows the presence of Ru nanoparticles. The structure was a hexagonal phase having lattice parameters a=0.2714 nm and c=0.4291 nm, and an average particle size of 7.49 nm.

Example 66

Synthesis of carbon nanotubes from 1/20 molar mixtures of $Ru_3(CO)_{12}$ and 1,2,4,5-tetrakis(phenylethynyl)benzene heated to 1000° C.—1,2,4,5-Tetrakis(phenylethynyl)benzene (0.10 g, 0.21 mmol) and $Ru_3(CO)_{12}$ (0.006 g, 0.0104 mmol) were weighed into an Al planchet and heated to 260° C. at reduced pressure for 5 minutes resulting in the rapid evolution of volatiles at the beginning of the heating. Upon cooling, a sample (23.43 mg) was heated at 10° C./min to 1000° C. (1 hr) resulting in a weight retention of 77% weight. Raman (characteristic pattern) and x-ray studies confirmed the presence of carbon nanotubes in the carbon nanotube-ruthenium nanoparticle carbon composition. The characteristic x-ray (111), (220), (222), and (422) reflections for carbon nanotubes were readily apparent along with ruthenium nanoparticles.

D. Formation of Manganese Nanoparticle Compositions

Example 67

Synthesis and conversion of 1/10 molar mixing of Mn (III)-2,4-pentanedionate and 1,2,4,5-tetrakis(phenylethynyl)benzene mixed in methylene chloride before heating to 1000° C. and formation of carbon nanotube-manganese nanoparticle composition—Mn(III)-2,4-pentanedionate (0.0296 g, 0.084 mmol) and 1,2,4,5-tetrakis(phenylethynyl)benzene (0.4020 g, 0.84 mmol) were mixed in 40 mL of methylene chloride at room temperature. The solvent was removed at reduced pressure. A sample (37.30 mg) of the mixture was heated at 10° C./min to 1000° C. resulting in a weight retention of 79%. Raman (characteristic pattern) and x-ray studies confirmed the presence of carbon nanoparticles-carbon nanotubes-manganese nanoparticle composition.

E. Formation of Tungsten Nanoparticle Compositions

Example 68

Synthesis and conversion of 1/10 molar mixing of tungsten hexacarbonyl and 1,2,4,5-tetrakis(phenylethynyl)benzene mixed in methylene chloride before heating to 1000° C. and formation of carbon nanotube-tungsten nanoparticle composition—Tungsten hexacarbonyl (0.0857 g, 0.24 mmol) an 1,2,4,5-tetrakis(phenylethynyl)benzene (1.16 g, 2.41 mmol) were mixed in 40 mL of methylene chloride at room temperature. The solvent was removed at reduced pressure. A sample (30.42 mg) of the mixture was heated at 10° C./min to 1000° C. resulting in a weight retention of 82%. Raman (characteristic pattern) and x-ray studies confirmed the presence of carbon nanoparticles-carbon nanotubes-tungsten nanoparticle composition.

Example 69

Synthesis and conversion of 1/10 molar mixing of cyclopentadienyltungsten tricarbonyl dimer and 1,2,4,5-tetrakis (phenylethynyl)benzene mixed in methylene chloride before heating to 1000° C. and formation of carbon nanotube-tungsten nanoparticle composition—Cyclopentadienyltungsten tricarbonyl dimer (0.0641 g, 0.096 mmol) and 1,2,4,5-tetrakis(phenylethynyl)benzene (0.4591 g, 0.96 mmol) were mixed in 25 mL of methylene chloride at room temperature. The solvent was removed at reduced pressure. A sample (30.21 mg) of the mixture was heated at 10° C./min to 1000° C. resulting in a weight retention of 82%. Raman (characteristic pattern) and x-ray studies confirmed the presence of carbon nanoparticles-carbon nanotubes-tungsten nanoparticle composition.

F. Formation of Cobalt-Iron Nanoparticle Compositions

Example 70

Pyrolysis of 1:1 hexacarbonyldicobalt complex of bis (ferrocenylethynyl)butadiyne and formation of carbon nanotubes—A sample (40.77 mg) of 1:1 hexacarbonyldicobalt complex of bis(ferrocenylethynyl)butadiyne prepared as in Example 14 was heated at 10° C./min to 1000° C. resulting in a weight retention of 65%. A Raman spectrum showed the characteristic sharp D and G lines and sharp second order absorption peaks between 2450 and 3250 $cm^{-1}$. X-ray diffraction studies showed the characteristic pattern attributed to formation of carbon nanotubes and cobalt nanoparticles in the bcc phase.

Example 71

Heat treatment of 1:1 hexacarbonyldicobalt complex of 1,4-bis(ferrocenyl)-butadiyne to 1300° C.—A sample (40.77 mg) of the 1:1 hexacarbonyldicobalt complex of 1,4-bis (ferrocenyl)butadiyne was placed in a TGA pan and heated at 10° C./min to 1300° C. resulting in a weight retention of 62%. X-ray diffraction studies showed the formation of carbon nanotubes and bcc cobalt nanoparticles. The pyrolyzed sample was magnetic as determined by the attraction to a bar magnet.

Example 72

Pyrolysis of 1:1 hexacarbonyldicobalt complex of 1-(ferrocenylethynyl)-4-(phenylethynyl)benzene and formation of carbon nanotubes-cobalt nanoparticles with 100% cobalt in the bcc lattice—A sample (16.45 mg) of 1:1 hexacarbonyldicobalt complex of 1-(ferrocenylethynyl)-4-(phenylethynyl)benzene prepared as in Example 15 was heated at 10° C./min to 1000° C. resulting in a weight retention of 69%. A Raman spectrum showed the characteristic sharp D and G lines and sharp second order absorption peaks between 2450 and 3250 $cm^{-1}$. X-ray diffraction studies showed the reported characteristic peaks for the presence of carbon nanotubes. The characteristic x-ray (111), (220), (222), and (422) reflections for carbon nanotubes were readily apparent along with the bcc cobalt nanoparticle pattern. The average size of bcc cobalt nanoparticles is 18.9 nm. This composition contains bcc cobalt with lattice parameter of 2.827 Å, which means that the iron is controlling the formation of the bcc cobalt and is not being incorporated into the lattice. This is the first time that 100% bcc cobalt lattice has been observed. The cobalt nanoparticles had a lattice parameter of a=0.2846 nm and an average particle size of 18.9 nm.

Example 73

Polymerization and conversion of 50/50 molar mixture of 1:1 hexacarbonyldicobalt complex of 1,2,4,5-tetrakis(phenylethynyl)benzene and 1-(ferrocenylethynyl)-4-(phenylethynyl)benzene to carbon nanotube-iron/cobalt alloy nanoparticle carbon composition—A mixture prepared from 11.15 mg (0.0289 mmol) of 1-(ferrocenylethynyl)-4-(phenylethynyl)benzene and 22.07 mg (0.0289 mmol) of 1:1 hexacarbonyldicobalt complex of 1,2,4,5-tetrakis(phenylethynyl)benzene prepared as in Example 3 was ground with a mortar & pestle and thoroughly mixed. A sample (21.01 mg) of the mixture was placed on a sample holder of a TGA system and heated at 10° C. under a nitrogen atmosphere from room temperature to 1000° C. resulting in a char yield of 75%. The x-ray diffraction study showed the four characteristic reflection values for carbon nanotubes and the pattern for bcc cobalt nanoparticles. The x-ray (111) reflection for carbon nanotubes was readily apparent. X-ray studies confirmed the presence of carbon nanotubes-bcc cobalt nanoparticles in the carbon composition.

Example 74

Heat-treatment of 1:1 hexacarbonyldicobalt complex of 1,2,4,5-tetrakis(phenylethynyl)benzene and 1-(ferrocenyl)-4-(phenylethynyl)benzene at 600° C. for 4 hr—1:1 Hexacarbonyldicobalt complex of 1,2,4,5-tetrakis(phenylethynyl)benzene (10.2 mg, 0.013 mmol) prepared as in Example 3 and 1-(ferrocenyl)-4-(phenylethynyl)benzene (6.6 mg, 0.017 mmol) were thoroughly mixed and heated at 10° C./min to 600° C. and isothermed for 4 hr under a nitrogen atmosphere in a platinum TGA cup using a TGA/DTA analyzer. After the heat-treatment at 600° C., the sample showed a weight retention of 49%. The sample showed magnetic properties as determined by its attraction to a bar magnet. X-ray diffraction study showed the formation of very small carbon nanoparticles-carbon nanotubes-cobalt nanoparticle in the carbon composition. X-ray diffraction studies showed the formation of cobalt in the cobalt-iron nanoparticle alloy in the bcc phase.

Example 75

Polymerization and conversion of 90/10 molar mixture of 1:1 hexacarbonyldicobalt complex of 1,2,4,5-tetrakis(phenylethynyl)benzene and 1-(ferrocenylethynyl)-4-(phenylethynyl)benzene to carbon nanotube-iron/cobalt alloy nanoparticle carbon composition—A mixture prepared from 0.772 mg (0.0020 mmol) of 1-(ferrocenylethynyl)-4-(phenylethynyl)benzene and 15.25 mg (0.0199 mmol) of 1:1 hexacarbonyldicobalt complex of 1,2,4,5-tetrakis(phenylethynyl)benzene prepared as in Example 3 was ground with a mortar & pestle and thoroughly mixed. A sample (11.25 mg) of the mixture was placed on a sample holder of a TGA system and heated at 10° C. under a nitrogen atmosphere from room temperature to 1000° C. resulting in a char yield of 70%. The x-ray diffraction study showed the four characteristic reflection values for carbon nanotubes and the pattern for bcc cobalt nanoparticles. The x-ray (111) reflection for carbon nanotubes was readily apparent. The sample showed strong magnetic properties as determined by its attraction to a bar magnet.

G. Formation of Iron-Ruthenium Nanoparticle Compositions

Example 76

Conversion of 50/50 mixture of 1:10 hexacarbonyldiiron and 1:10 nonacarbonyltriruthenium complexes of 1,2,4,5-tetrakis(phenylethynyl)benzene heated to 1000° C. to carbon nanotube-iron nanoparticle composition—The 50/50 molar mixture was prepared by taking the appropriate 1:10 iron (Example 11) and ruthenium (Example 13) complexes and dissolving in 15 mL of methylene chloride. The desired mixture was obtained by removal of solvent at reduced pressure. A sample (23.5 mg) of the mixture was heated at 10° C./min to 1000° C. resulting in a weight retention of 80%. Raman (characteristic pattern) and x-ray studies confirmed the presence of carbon nanoparticles-carbon nanotubes in the carbon nanotube-iron/ruthenium nanoparticle carbon composition. The metal nanoparticles were in the hexagonal phase with lattice parameters of a=0.2748 nm and c=0.4227 nm, and an average particle size of 1.99 nm.

Example 77

Conversion of 50/50 mixture of 1:10 hexacarbonyldiiron and 1:10 nonacarbonyltriruthenium complexes of 1,2,4,5-tetrakis(phenylethynyl)benzene heated to 1400° C. to carbon nanotube-iron/ruthenium alloy nanoparticle composition—The 50/50 molar mixture was prepared by taking the appropriate 1:10 iron (Example 11) and ruthenium (Example 13) complexes and dissolving in 15 mL of methylene chloride. The desired mixture was obtained by removal of solvent at reduced pressure. A sample (17.66 mg) of the mixture was heated at 10° C./min to 1400° C. resulting in a weight retention of 80%. Raman (characteristic pattern) and x-ray studies confirmed the presence of carbon nanoparticles-carbon nanotubes in the carbon naotube-metal nanoparticle carbon composition. Raman (characteristic pattern) and x-ray studies confirmed the presence of carbon nanotubes in the carbon nanotube-metal nanoparticle carbon composition. The characteristic x-ray (111), (220), (222), and (422) reflections for carbon nanotubes were readily apparent and the iron-ruthenium alloy nanoparticles.

H. Formation of Iron-Nickel Nanoparticle Compositions

Example 78

Conversion of bis(ferrocenylethynyl)bis(triphenylphosphine) nickel to metal nanoparticles—A sample (26.78 mg) was placed on a TGA pan and heated at 10° C./min to 1000° C. resulting in a weight retention of about 40%, which is mostly Fe—Ni fcc nanoparticles and some amorphous carbon. X-ray diffraction study shows the average metal nanoparticle size to be 23.1 nm.

Example 79

Conversion of 1/15 molar mixture of bis(ferrocenylethynyl)-bis(triphenylphosphine)nickel and 1,2,4,5-tetrakis(phenylethynyl)benzene to carbon nanotube-iron nickel composition—A mixture containing bis(ferrocenylethynyl)-bis(triphenylphosphine)nickel (7 mg, 0.0070 mmol) prepared as in Example 1 and 1,2,4,5-tetrakis(phenylethynyl)benzene (50 mg, 0.105 mmol) was prepared and mixed. The sample was added to an aluminum planchet, heated to melt at 250° C., and degassed for 5 minutes at reduced pressure. A sample (22.97 mg) was loaded onto a Pt TGA pan, heated at 250° C., and then heated at 10° C./min to 1000° C. Raman and x-ray diffraction studies showed the formation of carbon nanotube-iron nickel nanoparticle composition.

Example 80

Conversion of 1/15 molar mixture of bis(ferrocenylethynyl)-bis(triphenylphosphine)nickel and 1,2,4,5-tetrakis(phenylethynyl)benzene to carbon nanotube-iron nickel nanoparticle composition—Bis(ferrocenylethynyl)-bis(triphenylphosphine)nickel (0.014 g, 0.014 mmol) prepared as in Example 1 and 1,2,4,5-tetrakis(phenylethynyl)benzene (0.10 g, 0.21 mmol) were added to an Al planchet, heated to melt at 225° C. for 10 min at reduced pressure, and then quickly cooled. A sample (22.97 mg) of resulting mixture was loaded onto Pt TGA pan and heated at 10° C./min to 1000° C. yielding a weight retention of 63%. Raman and x-ray diffraction studies showed the characteristic patterns for carbon nanotube formation. X-ray diffraction also showed Fe—Ni nanoparticles (15 nm in size) in the fcc form.

I. Formation of Cobalt-Ruthenium Nanoparticle Compositions

Example 81

Conversion of 75/25 molar mixture of 1:10 hexacarbonyldicobalt and 1:10 nonacarbonyltriruthenium complexes of 1,2,4,5-tetrakis(phenylethynyl)benzene heated at 1000° C. to carbon nanotube-cobalt/ruthenium alloy nanoparticle composition—The 75/25 molar mixture was prepared by taking the appropriate 1:10 cobalt (Example 6) and ruthenium (Example 13) complexes and dissolving in 15 mL of methylene chloride. The desired mixture was obtained by removal of solvent at reduced pressure. A sample (27.10 mg) of the mixture was heated at 10° C./min to 1000° C. resulting in a weight retention of 80%. Raman (characteristic pattern) and x-ray studies confirmed the presence of carbon nanotubes in the carbon nanotube-metal nanoparticle carbon composition. The characteristic x-ray (111), (220), (222), and (422) reflections for carbon nanotubes is readily apparent along with hcp phase of cobalt-ruthenium nanoparticles.

Example 82

Conversion of 50/50 mixture of 1:10 hexacarbonyldicobalt and 1:10 nonacarbonyltriruthenium complexes of 1,2,4,5-tetrakis(phenylethynyl)benzene heated to 1000° C. to carbon nanotube-cobalt/ruthenium alloy nanoparticle composition—The 50/50 molar mixture was prepared by taking the appropriate 1:10 cobalt (Example 5) and ruthenium (Example 13) complexes and dissolving in 15 mL of methylene chloride. The desired mixture was obtained by removal of solvent at reduced pressure. A sample (24.69 mg) of the mixture was heated at 10° C./min to 1000° C. resulting in a weight retention of 76%. Raman (characteristic pattern) and x-ray studies confirmed the presence of carbon nanotubes in the carbon nanotube-metal nanoparticle carbon composition. The characteristic x-ray (111), (220), (222), and (422) reflections for carbon nanotubes were readily apparent along with that of cobalt-ruthenium nanoparticles. The metal nanoparticles were in the hexagonal phase with lattice parameters of a=0.2590 nm and c=0.4155 nm, and an average particle size of 4.51 nm.

J. Formation of Cobalt-Palladium Nanoparticle Compositions

Example 83

Formation and conversion of 75/25 solvent mixing of 1/10 molar concentrations of cobalt and palladium solvent mixture of 1,2,4,5-tetrakis(phenylethynyl)benzene heated to 1000° C. to carbon nanotube-cobalt/palladium alloy nanoparticle composition—1/10 Cobalt and palladium molar mixtures of 1,2,4,5-tetrakis(phenylethynyl)benzene were prepared from $Co_2(CO)_8$ and Pd (II) acetylacetonate by solvent mixing. A 75/25 molar mixture was prepared from the 1/10 cobalt mixture (0.0944 g, 0.124 mmol) and palladium mixture (0.0309 g, 0.0411 mmol) by dissolving in 20 mL of methylene chloride. The desired mixture was obtained by removal of solvent at reduced pressure. A sample (32.40 mg) of the 75/25 mixture was heated at 10° C./min to 1000° C. resulting in a weight retention of 80%. Raman (characteristic pattern) and x-ray studies confirmed the presence of carbon nanotubes in the carbon nanotube-Co/Pd alloy nanoparticle composition. The characteristic x-ray (111), (220), (222), and (422) reflections for carbon nanotubes were readily apparent along with fcc phase of cobalt-palladium nanoparticles. This is the first time that the fcc phase of cobalt-palladium nanoparticles has been observed. The composition is magnetic as determined by its attraction to a bar magnet. The metal nanoparticles were in the cubic phase with a lattice parameter of a=0.3729 nm, and an average particle size of 9.75 nm.

Example 84

Formation and conversion of 50/50 solvent mixing of 1/10 molar concentrations of cobalt and palladium solvent mixture of 1,2,4,5-tetrakis(phenylethynyl)benzene heated to 1000° C. to carbon nanotube-cobalt/palladium alloy nanoparticle composition—1:10 Cobalt and palladium molar mixtures of 1,2,4,5-tetrakis(phenylethynyl)benzene were prepared from $Co_2(CO)_8$ and Pd (II) acetylacetonate by solvent mixing. A 50/50 molar mixture was prepared for the 1/10 cobalt mixture (0.0673 g, 0.088 mmol) and palladium mixture (0.0661 g, 0.088 mmol) by dissolving in 15 mL of methylene chloride. The desired mixture was obtained by removal of solvent at reduced pressure. A sample (23.20 mg) of the 50/50 mixture was heated at 10° C./min to 1000° C. resulting in a weight retention of 82%. Raman (characteristic pattern) and x-ray studies confirmed the presence of carbon nanotubes in the carbon nanotube-Co/Pd alloy nanoparticle composition. The characteristic x-ray (111), (220), (222), and (422) reflections for carbon nanotubes was readily apparent along with fcc phase of cobalt-palladium nanoparticles. This is the first time that the fcc phase of cobalt-palladium nanoparticles has been observed. The composition is magnetic as determined by its attraction to a bar magnet. The metal nanoparticles were in the cubic phase with a lattice parameters of a=0.3639 nm, and an average particle size of 5.85 nm.

Formation and conversion of 25/75 solvent mixing of 1/10 molar concentration of cobalt and palladium solvent mixture of 1,2,4,5-tetrakis(phenylethynyl)benzene heated to 1000° C. to carbon nanotube-cobalt/palladium alloy nanoparticle composition—1/10 Cobalt and palladium molar mixtures of 1,2,4,5-tetrakis(phenylethynyl)benzene were prepared from $CO_2(CO)_8$ and Pd (II) acetylacetonate by solvent mixing. A 25/75 molar mixture was prepared from the 1/10 cobalt mixture (0.229 g, 0.2997 mmol) and palladium mixture (0.674 g, 0.0899 mmol) by dissolving in 20 mL of methylene chloride. The desired mixture was obtained by removal of solvent at reduced pressure. A sample (27.51 mg) of the 25/75 mixture was heated at 10° C./min to 1000° C. resulting in a weight retention of 82%. Raman (characteristic pattern) and x-ray studies confirmed the presence of carbon nanotubes in the carbon nanotube-Co/Pd alloy nanoparticle composition. The characteristic x-ray (111), (220), (222), and (422) reflections for carbon nanotubes were readily apparent along with fcc phase of cobalt-palladium nanoparticles. This is the first time that the fcc phase of cobalt-palladium nanoparticles has been observed. The composition is magnetic as determined by its attraction to a bar magnet.

K. Formation of Iron-Palladium Nanoparticle Compositions

Example 86

Conversion of bis(ferrocenylethynyl)bis(triethylphosphine)palladium to iron-palladium nanoparticle composition—A sample (24.94 mg) of bis(ferrocenylethynyl)-bis(triethylphosphine)palladium was heated at 200° C. for 1 hr, cooled to 70° C., and heated at 10° C./min to 1000° C. resulting in a weight retention (char yield) of 61%. X-ray studies confirmed the presence of iron-palladium nanoparticles in the FePd phase. The average size was 8.3 nm.

Example 87

Conversion of bis(ferrocenylethynyl)bis(triethylphosphine)palladium to iron-palladium nanoparticle composition—A sample (31.96 mg) of bis(ferrocenylethynyl)-bis(triethylphosphine)palladium was heated at 200° C. for 4 hr, cooled to 70° C., and then heated at 10° C./min to 1000° C. resulting in a weight retention (char yield) of 51%. X-ray studies confirmed the presence of iron-palladium nanoparticles in the FePd phase. The average size was 7.7 nm.

Example 88

Conversion of bis(ferrocenylethynyl)bis(triethylphosphine)palladium to iron-palladium nanoparticle composition—A sample (22.25 mg) of bis(ferrocenylethynyl)-bis(triethylphosphine)palladium was heated at 200° C. for 4 hr, cooled to 25° C., and heated at 10° C./min to 1000° C. resulting in a weight retention (char yield) of 65%. X-ray studies confirmed the presence of iron-palladium nanoparticles in the FePd phase. The average size was 6.7 nm.

Example 89

Conversion of bis(ferrocenylethynyl)-bis(triethylphosphine)palladium to carbon nanotubes nanotube-iron palladium nanoparticle composition upon heating to 1400° C.—A sample (38.60 mg) of bis(ferrocenylethynyl)-bis(triethylphosphine)palladium was heated at 10° C./min to 1400° C. resulting in a weight retention (char yield) of 50%. Raman (characteristic pattern) and x-ray studies confirmed the presence of carbon nanotubes in the carbon nanotube-metal nanoparticle carbon composition. The characteristic x-ray (111), (220), (222), and (422) reflections for carbon nanotubes were readily apparent along with the iron-palladium nanoparticles in the FePd phase. The metal nanoparticles were in the cubic phase with a lattice parameter of a=0.3817 nm, and an average particle size of 11.7 nm.

Example 90

Conversion of mixture of bis(ferrocenylethynyl)-bis(triethylphosphine)palladium and 1,4-bis(ferrocenylethynyl) benzene to new $Fe_3Pd$ phase, which is highly magnetic—Bis(ferrocenylethynyl)bis(triethylphosphine)palladium (0.0175 g, 0.023 mmol) and 1,4-bis(ferrocenylethynyl)benzene (0.0116 g, 0.023 mmol) were thoroughly mixed. A sample (21.98 mg) was weighed onto a Pt TGA pan and heated at 10° C./min to 1000° C. resulting in a weight retention (char yield) of 48%. X-ray diffraction analysis showed the formation of $Fe_3Pd$, as determined by the pattern, which is a new phase of palladium that is highly magnetic. The average size of the $Fe_3Pd$ nanoparticles is 13.0 nm. The lattice parameter for $Fe_3Pd$ was 0.3781 nm.

Example 91

Conversion of mixture of bis(ferrocenylethynyl)bis(triethylphosphine)palladium, 1-ferrocenylethynyl-4-phenylethynylbenzene, and 1,2,4,5-tetrakis(phenylethynyl)benzene to new $Fe_3Pd$ phase, which is highly magnetic—Bis(ferrocenylethynyl)bis(triethylphosphine)palladium (0.0175 g, 0.023 mmol), 1-ferrocenylethynyl-4-phenylethynylbenzene (0.0116 g, 0.0307 mmol), and 1,2,4,5-tetrakis(phenylethynyl)benzene (0.0224 g, 0.046 mmol) were thoroughly mixed. A sample (24.28 mg) was weighed onto a Pt TGA pan and heated at 10° C./min to 1000° C. resulting in a weight retention (char yield) of 64%. X-ray diffraction analysis showed the formation of nanoparticles of $Fe_3Pd$ (13 nm), which is a new phase of palladium that is highly magnetic, and Pd (8.5 nm). The lattice parameter for $Fe_3Pd$ was 0.3757 nm.

L. Formation of Iron-Platinum Nanoparticle Compositions

Example 92

Conversion of bis(ferrocenylethynyl)bis(triethylphosphine)platinum to iron-platinum alloy nanoparticle composition upon heating to 1000° C.—A sample (50.33 mg) of bis(ferrocenylethynyl)-bis(triethylphosphine)platinum was heated at 10° C./min to 1000° C. resulting in a weight retention (char yield) of 46%. X-ray studies confirmed the formation of iron-platinum nanoparticles. The composition was magnetic. X-ray diffraction analysis showed iron-platinum nanoparticles ($Fe_4Pt$) with an average particle size of 6.3 nm.

Example 93

Conversion of bis(ferrocenylethynyl)bis(triethylphosphine)platinum to iron-platinum alloy nanoparticle composition upon heating to 1300° C.—A sample (71.14 mg) of bis(ferrocenylethynyl)-bis(triethylphosphine)platinum was heated at 10° C./min to 1300° C. and held for 30 min resulting in a weight retention (char yield) of 39%. X-ray studies confirmed the formation of iron-platinum nanoparticles. The composition was magnetic. X-ray diffraction analysis showed iron-platinum nanoparticles ($Fe_4Pt$) with an average particle size of 6.3 nm. The new platinum alloy nanoparticles were in the tetragonal phase having lattice parameters of a=0.3855 nm and c=0.3755 nm, and an average particle size of 10.2 nm.

M. Formation of Cobalt-Manganese Nanoparticle Compositions

Example 94

Formation and conversion of 50/50 solvent and weight mixing of 1/10 molar concentrations of cobalt and manganese solvent mixtures of 1,2,4,5-tetrakis(phenylethynyl)benzene heated to 1000° C. to cobalt/manganese alloy nanoparticle composition—1/10 Cobalt and manganese molar mixtures of 1,2,4,5-tetrakis(phenylethynyl)benzene were prepared from $Co_2(CO)_8$ and manganese (III) 2,4-pentanedionate by solvent mixing. A 50/50 weight mixture of Co:Mn was prepared from the 1/10 cobalt molar mixture (101 mg) and 1/10 manganese molar mixture (101 mg) by dissolving in 20 mL of methylene chloride. The desired mixture was obtained by removal of solvent at reduced pressure. A sample (28.11 mg) of 50/50 mixture was heated at 10° C./min to 1000° C. resulting in a weight retention of 74%. The x-ray (111)(220), (222), and (422) reflections for carbon nanotubes are readily apparent along with the fcc cobalt-manganese nanoparticle phase. The x-ray (111) reflection for carbon nanotubes is readily apparent.

Example 95

Formation and conversion of 50/50 solvent weight mixing of 1/10 molar concentrations of cobalt and manganese solvent mixtures of 1,2,4,5-tetrakis(phenylethynyl)benzene heated to 1300° C. to cobalt/manganese alloy nanoparticle composition—1/10 Cobalt and manganese molar mixtures of 1,2,4,5-tetrakis(phenylethynyl)benzene were prepared from $Co_2(CO)_8$ and manganese (III), 2,4-pentanedionate by solvent mixing. A 50/50 weight mixture of Co:Mn was prepared from the 1/10 cobalt molar mixture (101 mg) and 1/10 manganese molar mixture (101 mg) by dissolving in 20 mL of methylene chloride. The desired mixture was obtained by removal of solvent at reduced pressure. A sample (27.7 mg) of 50/50 mixture was heated at 10° C./min to 1000° C. resulting in a weight retention of 75%. The x-ray (111) (220), (222), and (422) reflections for carbon nanotubes are readily apparent, along with the fcc cobalt-manganese nanoparticle phase. The x-ray (111) reflection for carbon nanotubes is readily apparent.

We claim:

1. A process of making metal nanoparticles comprising the steps of:
   providing a precursor composition comprising at least one metallic compound and at least one organic compound;
   wherein the organic compound is selected from the group consisting of an ethynyl compound, a metal-ethynyl complex, and combinations thereof;
   wherein the precursor composition is a liquid or solid at room temperature; and
   heating the precursor composition under conditions effective to produce metal nanoparticles.

2. The process of claim 1, wherein the metallic compound and the organic compound are the same compound.

3. The process of claim 1, wherein the metal in the metallic compound is selected from the group consisting of a transition metal, iron, cobalt, nickel, ruthenium, osmium, molybdenum, tungsten, yttrium, lutetium, copper, manganese, chromium, zinc, palladium, silver, platinum, tin, tellurium, bismuth, germanium, antimony, aluminum, indium, selenium, cadmium, gadolinium, hafnium, magnesium, titanium, lanthanum, cerium, praseodymium, neodymium, terbium, dysprosium, holmium, erbium, and combinations thereof.

4. The process of claim 1, wherein the metallic compound is selected from the group consisting of a metallocenyl compound, a metal salt, a metal-ethynyl complex, and combinations thereof.

5. The process of claim 4, wherein the metallocenyl compound is selected from the group consisting of a ferrocenyl compound, a metallocenylethynyl compound, 1,4-bis(ferrocenyl)butadiyne, metallocenylethynylaromatic compound, 1,3-bis(ferrocenylethynyl)benzene, 1,4-bis(ferrocenylethynyl)benzene, 1-ferrocenylethynyl)-3-(phenylethynyl)benzene, 1-(ferrocenylethynyl)-4-(phenylethynyl)benzene, 1,3,5-tris(ferrocenylethynyl)benzene, a metallocenylethynyl phosphine metal salt, bis(ferrocenylethynyl)-bis(triphenylphosphine)nickel, bis(ferrocenylethynyl)-bis(triethylphosphine)palladium, bis(ferrocenylethynyl)-bis(triethylphosphine)platinum, and combinations thereof.

6. The process of claim 4, wherein the metal salt is selected from the group consisting of a metal carbonyl salt, nonacarbonyl diiron, octacarbonyl dicobalt, dodecacarbonyl triruthenium, hexacarbonyl tungsten, a phosphine metal salt, bis(triphenylphosphine)nickel, bis(triethylphosphine)palladium, bis(triethylphosphine)platinum, dicarbonyl bis(triphenylphosphine)nickel, palladium (II) acetylacetonate, manganese (III)-2,4-pentanedionate, cyclopentadienyl tungsten tricarbonyl dimer, and combinations thereof.

7. The process of claim 1, wherein the metal-ethynyl complex is selected from the group consisting of a metal carbonyl-ethynyl complex, hexacarbonyl dicobalt complex of 1,2,4,5-tetrakis(phenylethynyl)benzene, hexacarbonyl diiron complex of 1,2,4,5-tetrakis(phenylethynyl)benzene, nonacarbonyl triruthenium complex of 1,2,4,5-tetrakis(phenylethynyl)benzene, a metal carbonyl-metallocenylethynyl containing complex, hexacarbonyl dicobalt complex of 1,4- bis(ferrocenyl)butadiyne, hexacarbonyl dicobalt complex of 1-(ferrocenylethynyl)-4-(phenylethynyl)benzene, hexacarbonyl dicobalt complex of 1-(ferrocenylethynyl)-3-(phenylethynyl)benzene, and combinations thereof.

8. The process of claim 1, wherein the ethynyl compound is selected from the group consisting of an ethynylaromatic compound, 1,2,3-tris(phenylethynyl)benzene, 1,2,4-tris(phenylethynyl)benzene, 1,3,5-tris(phenylethynyl)benzene, 1,2,3,4-tetrakis(phenylethynyl)benzene, 1,2,3,5-tetrakis(phenylethynyl)benzene, 1,2,4,5-tetrakis(phenylethynyl)benzene, 1,2,3,4,5-pentakis(phenylethynyl)benzene, 1,2,3,4,5,6-hexakis(phenylethynyl)benzene, and combinations thereof.

9. The process of claim 1, wherein at least one of the compounds is an aromatic compound.

10. The process of claim 1, wherein the compounds are combined by a method selected from the group consisting of mechanical mixing, solvent mixing, and partial complexation.

11. The process of claim 1, wherein the heating step comprises heating the precursor composition under nitrogen to a temperature of at least about 300° C.

12. A process of making metal nanoparticles comprising the steps of:
providing a precursor composition comprising a polymer and a metallic component;
wherein the polymer has crosslinked ethynyl groups;
wherein the metallic component is bonded to the polymer, combined with the polymer, or combinations thereof; and
heating the precursor composition under conditions effective to produce metal nanoparticles.

13. The process of claim 12, wherein the metallic component is selected from the group consisting of a metallocenyl group, a metal-ethynyl complex group, a metal salt, elemental metal, and combinations thereof.

14. The process of claim 13, wherein the metallocenyl group is ferrocenyl.

15. The process of claim 13, wherein the metal-ethynyl complex group is selected from the group consisting of hexacarbonyl dicobalt-ethynyl complex group, hexacarbonyl diiron-ethynyl complex group, nonacarbonyl triruthenium-ethynyl complex group, and combinations thereof.

16. The process of claim 13, wherein the metal salt is selected from the group consisting of a metal carbonyl salt, nonacarbonyl diiron, octacarbonyl dicobalt, dodecacarbonyl triruthenium, hexacarbonyl tungsten, a phosphine metal salt, bis(triphenylphosphine)nickel, bis(triethylphosphine)palladium, bis(triethylphosphine)platinum, dicarbonyl bis(triphenylphosphine)nickel, palladium (II) acetylacetonate, manganese (III)-2,4-pentanedionate, cyclopentadienyl tungsten tricarbonyl dimer, and combinations thereof.

17. The process of claim 12, wherein the heating step comprises heating the precursor composition under nitrogen to a temperature of at least about 300° C.

* * * * *